US012680024B2

(12) United States Patent
Snow et al.

(10) Patent No.: US 12,680,024 B2
(45) Date of Patent: Jul. 14, 2026

(54) LIQUID CRYSTAL DEVICE

(71) Applicant: Merck Patent GmbH, Darmstadt (DE)

(72) Inventors: Benjamin Snow, Nottingham (GB); Simon Siemianowski, Darmstadt (DE); Izumi Saito, Darmstadt (DE); Konstantin Schneider, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/792,438

(22) PCT Filed: Feb. 10, 2021

(86) PCT No.: PCT/EP2021/053127
§ 371 (c)(1),
(2) Date: Jul. 13, 2022

(87) PCT Pub. No.: WO2021/160633
PCT Pub. Date: Aug. 19, 2021

(65) Prior Publication Data

US 2023/0105959 A1 Apr. 6, 2023

(30) Foreign Application Priority Data

Feb. 13, 2020 (EP) .................................... 20157165

(51) Int. Cl.

| | |
|---|---|
| ***G02F 1/1333*** | (2006.01) |
| ***C09K 19/04*** | (2006.01) |
| ***G02F 1/29*** | (2006.01) |
| *C09K 19/12* | (2006.01) |
| *C09K 19/30* | (2006.01) |
| *C09K 19/34* | (2006.01) |

(52) U.S. Cl.

CPC .............. *C09K 19/04* (2013.01); *G02F 1/292* (2013.01); *G02F 1/294* (2021.01); *C09K 2019/0448* (2013.01); *C09K 2019/0466* (2013.01); *C09K 2019/123* (2013.01); *C09K 2019/3004* (2013.01); *C09K 2019/301* (2013.01); *C09K 2019/3019* (2013.01); *C09K 2019/3025* (2013.01); *C09K 2019/3422* (2013.01); *G02F 2202/023* (2013.01)

(58) Field of Classification Search

CPC ........................................................ G02F 1/13
See application file for complete search history.

(56) References Cited

U.S. PATENT DOCUMENTS

2011/0063564 A1 3/2011 Atkuri et al.
2017/0219744 A1* 8/2017 Nimura ................ G02B 3/0025
2017/0299941 A1* 10/2017 Serati ...................... G02F 1/292
2018/0002604 A1* 1/2018 Yoon ...................... C09K 19/20
2021/0071081 A1 3/2021 Lietzau et al.

FOREIGN PATENT DOCUMENTS

| | | | |
|---|---|---|---|
| IN | 202048003721 A | 1/2020 | |
| KR | 20120004328 A | 1/2012 | |
| WO | 2019206789 A1 | 10/2019 | |
| WO | WO-2019206788 A1 * | 10/2019 | ............ C07C 13/28 |
| WO | WO-2021160705 A1 * | 8/2021 | |

OTHER PUBLICATIONS

Yoon Won-Jin et al. “Giant surfactants for the construction of automatic liquid crystal alignment layers”, Journal of Materials Chemistry C, vol. 7, No. 28, Jul. 18, 2019, pp. 8500-8514 (Year: 2019).*
He Rui et al. “Polyimide-free homogeneous photoalignment induced by polymerisable liquid crystal containing cinnamate moiety”, Liquid Crystals, vol. 45, No. 9, Jul. 15, 2018, pp. 1342-1352 (Year: 2018).*
International Search Report dated May 6, 2021 issued in corresponding PCT/EP2021/053127 application (4 pages).
W-J Yoon et al., “Giant Surfactants for the Construction of Automatic Liquid Crystal Alignment Layers”, Journal of Materials Chemistry C, vol. 7, No. 28 (Jul. 28, 2019) pp. 8500-8514.
R. He et al., “Polyimide-Free Homogeneous Photoalignment Induced by Polymerisable Liquid Crystal Containing Cinnamate Moiety”, Liquid Crystals, vol. 45, No. 9 (2018) pp. 1342-1352.
China National Intellectual Property Administration Office Action dated May 15, 2025 issued in corresponding application 202180013993.4.

* cited by examiner

*Primary Examiner* — Geraldina Visconti

(74) *Attorney, Agent, or Firm* — Millen, White, Zelano & Branigan, P.C.; Brion P. Heaney

(57) ABSTRACT

A liquid crystal device is provided having at least two opposing transparent substrates, at least one liquid crystal switching layer sandwiched between the opposing substrates. The liquid crystal layer contains one or more polymerized photoreactive mesogens of formula I, $$R^{11}\text{-}Sp^{11}\text{-}X^{11}[\text{-}A\text{-}Z]_o\text{-}A^{11}\text{-}CY^{11}{=}CY^{12}[{-}C{-}O]_x[{-}O]_y\text{-}A[\text{-}Z\text{-}A]_p\text{-}X^{21}\text{-}Sp^{21}\text{-}R^{21} \quad \text{I}$$

wherein $R^{11}$, $R^{21}$, $A^{11}$, A, Z, $X^{11}$, $X^{21}$, $Y^{11}$, $Y^{12}$, $Sp^{11}$, $Sp^{21}$, o, p, x and y are as defined herein, and one or more nematogenic compounds. An electrode structure is provided on one or both of the opposing substrates, and one or more of the substrates are additionally provided with an optical grating or a lens structure adjacent to the liquid crystal switching layer.

17 Claims, No Drawings

LIQUID CRYSTAL DEVICE

TECHNICAL FIELD

The invention relates to a liquid crystal device comprising at least two opposing transparent substrates, at least one liquid crystal switching layer sandwiched between said opposing substrates comprising one or more polymerised photoreactive mesogens of formula I, $$R^{11}\text{-}Sp^{11}\text{-}X^{11}[\text{-}A\text{-}Z]_o\text{-}A^{11}\text{-}CY^{11}{=}CY^{12}[\text{—}C{=}O]_x[\text{—}O]_y\text{-}A[\text{-}Z\text{-}A]_p\text{—}X^{21}\text{-}Sp^{21}\text{-}R^{21} \qquad \text{I}$$

wherein $R^{11}$, $R^{21}$, $A^{11}$, A, Z, $X^{11}$, $X^{21}$, $Y^{11}$, $Y^{12}$, $Sp^{11}$, $Sp^{21}$, o, p, x and y have one of the meanings as given in claim 1, and one or more nematogenic compounds, an electrode structure provided on one or both of the opposing substrates, characterized in that one or more of said substrates corresponds to an optical grating or a lens structure or said substrates are additionally provided with an optical grating or a lens structure adjacent to the LC switching layer.

The invention is further related to a method of production of said liquid crystal device, to the use of said Liquid Crystal device in various types of optical and electro-optical devices, and to electro-optical devices comprising the liquid crystal device

BACKGROUND AND PRIOR ART

Precisely positioning a laser beam or light ray is crucial for practical applications, such as light detection and ranging (LiDAR), displays, microscopy, optical tweezers, and laser micro-machining. For example, LiDAR, as the most pivotal application promoting beam steering techniques, can map landscapes in a three-dimensional (3D) space and serves as an enabling technology for space station navigation, telescope docking, and autonomous cars, drones, and underwater vehicles. To date, a plethora of beam steering methods have been demonstrated.

Generally, they can be divided into two groups: Mechanical and non-mechanical beam controls. Mechanical approaches include scanning/rotating mirrors, rotating prisms, piezo actuators, and micro-electromechanical system (MEMS) mirrors. On the other hand, non-mechanical options include acousto-optic and electro-optic deflectors, electro-wetting, and liquid crystal (LC) technologies, to name a few.

Although traditional mechanical beam steering devices are reasonably robust, some technical issues remain to be overcome, such as relatively short lifetimes, heavy weight, large power consumption, and high cost. In contrast, recently-developed mechanical and non-mechanical beam steerers show promise for resolving these shortcomings. As a strong candidate, LC-based beam steerers can be lightweight, compact, consume low amounts of power, and inexpensive.

LCs are self-assembled soft materials, consisting of certain anisotropic molecules with orientational orders. They can respond to various external stimuli, including heat, electric and magnetic fields, and light. For instance, in the presence of an electric field, LC directors can be re-oriented, due to both the optical and dielectric anisotropies of the LC molecules, resulting in refractive index modulation (birefringence). Using this simple principle, LC spatial light modulators (SLMs)—also called LC optical phased arrays (OPAs)—can be established by pixelating such refractive index modulators in a two-dimensional (2D) array. While LC-based OPAs were developed more than three decades ago, they continue to advance. Meanwhile, other LC-based beam steerers, such as compound prisms, resistive electrodes, LC-cladding waveguides, Pancharatnam-Berry phase deflectors, and LC volume gratings, have also emerged, exhibiting great potential for new applications.

Optical beam steering or beam focusing devices based on liquid crystals are, for example, described in US 2002/003601 A1, US 2007/0182915 A1 or US 2019/0318706 A1.

In detail, US 2002/003601 A1 discloses a system of beam steering using electrical operation comprising a grating and a liquid crystal material.

US 2007/0182915 A1 discloses a liquid crystal diffraction lens element and an optical head device, which can switch focal lengths of both of outgoing light and returning light by a single element.

US 2019/0318706 A1 discloses a display apparatus including an electronic display having a pixel array configured to display a sequence of subframes, and an image shifting electro-optic device that is operable to shift at least a portion of an image of the display pixel array synchronously with displaying the sequence of subframes, to form a sequence of offset subframe images for providing an enhanced image resolution a pixel correction in a compound image. The image shifting electro-optic device may include a polarization switch in series with a polarization grating for shifting image pixels between offset image positions in coordination with displaying consecutive subframes.

The above-described optical beam steering or beam focusing devices all require an alignment layer, such as polyimide, in order to initially align the liquid crystal bulk in the required orientation.

The effort to produce a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

Rubbed polyimide has been used for a long time to align liquid crystals.

The rubbing process causes several problems: mura, contamination, problems with static discharge, debris, etc.

Furthermore, the polyimide layers are usually annealed at higher temperatures, and consequently not all substrate materials or substrate stacks can be utilized due to their sensitivity for higher temperatures.

Another aspect is that traditional alignment methods, such as rubbed polyimide layers, cannot provide suitable alignment when surface features of substrates are too deep or too highly structured.

Photoalignment is a technology for achieving liquid crystal (LC) alignment that avoids rubbing by replacing it with a light-induced orientational ordering of the alignment surface. This can be achieved through the mechanisms of photodecomposition, photodimerization, and photoisomerization (N. A. Clark et al. Langmuir 2010, 26(22), 17482-17488, and literature cited therein) by means of polarised light. However, still a suitably derivatised polyimide layer is required that comprises the photoreactive group. Further, substrates with a uniform surface anchoring energy and/or a uniform surface in terms of potential reliefs and/or surface treatments are needed. Consequently, a further improvement would be to avoid the use of polyimide at all.

For VA displays this was achieved by adding a self-alignment agent to the LC that induces homeotropic alignment in situ by a self-assembling mechanism as disclosed in WO 2012/104008 and WO 2012/038026.

For planar aligned display modes, in particular, for FFS or IPS modes, this was achieved by adding photoreactive mesogens that enable photoalignment of a liquid crystal mixture in situ, i.e. after assembly of the display, by means of linearly polarized light as it is disclosed e.g. in WO 2019/206791. However, only substrates with a uniform surface anchoring energy and/or a uniform surface in terms of potential reliefs and/or surface treatments are described.

In contrast to display applications, optical beam steering devices or optical beam focusing devices utilize often structured or non-uniform substrates such as gratings or lens structures or even plastic substrates that are not compatible with the baking process of a poly imide (PI) layer.

Thus, there is a great demand for optical beam steering devices or optical beam focusing devices that do not utilize an extra alignment layer or that that do not require PI processing onto individual substrates and therefore relying on the surface being flat.

Surprisingly, the inventors have found out that one or more of the above-mentioned aims can be achieved by providing a liquid crystal device comprising at least two opposing transparent substrates, at least one liquid crystal switching layer sandwiched between said opposing substrates comprising one or more polymerised photoreactive mesogens and one or more nematogenic compounds, an electrode structure provided on one or both of the opposing substrates, characterized in that one or more of said substrates correspond to an optical grating or a lens structure or said substrates are additionally provided with an optical grating or a lens structure adjacent to the LC switching layer.

Other aims of the present invention are immediately evident to the person skilled in the art from the following detailed description.

TERMS AND DEFINITIONS

A photoreactive group according to the present invention is a functional group of a molecule that causes a change of the geometry of the molecule either by bond rotation, skeletal rearrangement or atom- or group-transfer, or by dimerization, upon irradiation with light of a suitable wavelength that can be absorbed by the molecule.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

A photoreactive mesogen according to the present invention is a mesogenic compound comprising one or more photoreactive groups.

Examples of photoreactive groups are —C═C— double bonds and azo groups (—N═N—).

Examples of molecular structures and sub-structures comprising such photoreactive groups are stilbene, (1,2-difluoro-2-phenyl-vinyl)-benzene, cinnamate, 4-phenylbut-3-en-2-one, chalcone, coumarin, chromone, pentalenone and azobenzene.

According to the present application, the term "linearly polarised light" means light, which is at least partially linearly polarized. Preferably, the aligning light is linearly polarized with a degree of polarization of more than 5:1. Wavelengths, intensity and energy of the linearly polarised light are chosen depending on the photosensitivity of the photoalignable material. Typically, the wavelengths are in the UV-A, UV-B and/or UV-C range or in the visible range. Preferably, the linearly polarised light comprises light of wavelengths less than 450 nm, more preferably less than 420 nm at the same time the linearly polarised light preferably comprises light of wavelengths longer than 280 nm, preferably more than 320 nm, more preferably over 350 nm.

The term "organic group" denotes a carbon or hydrocarbon group.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group.

Unsaturated groups are, for example, aryl, alkenyl or alkynyl groups. A carbon or hydrocarbon radical having 3 or more atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group, or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ aryl-alkyloxy, $C_2$-$C_{40}$ heteroaryl, $C_4$-$C_{40}$ cycloalkyl, $C_4$-$C_{40}$ cycloalkenyl, etc. Preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one more non-adjacent $CH_2$ groups may each be replaced, independently of one another, by —C($R^z$)═C($R^z$)—, —C≡C—, —N($R^z$)—, —O—, —S—, —CO—, —CO—O—, —O—CO—, —O—CO—O— in such a way that O and/or S atoms are not linked directly to one another.

$R^z$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO— or —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Preferred amino groups are, for example, dimethylamino, methylamino, methylphenylamino and phenylamino.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Preference is given to mono-, bi- or tricyclic aryl groups having 6 to 25 C atoms and mono-, bi- or tricyclic heteroaryl groups having 2 to 25 C atoms, which optionally contain fused rings and are optionally substituted.

Preference is furthermore given to 5-, 6- or 7-membered aryl and hetero-aryl groups, in which, in addition, one or more CH groups may be replaced by N, S or O in such a way that O atoms and/or S atoms are not linked directly to one another.

Preferred aryl groups are derived, for example, from the parent structures benzene, biphenyl, terphenyl, [1,1':3',1"]terphenyl, naphthalene, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalin-imidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dihydro-thieno [3,4-b]-1,4-dioxin, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, and electron-withdrawing groups, such as fluorine, nitro or nitrile.

Preferred substituents, unless stated otherwise, also referred to as "L" above and below, are F, Cl, Br, I, —CN, —$NO_2$, —NCO, —NCS, —OCN, —SCN, —C(═O)N$(R^z)_2$, —C(═O)$Y^1$, —C(═O)$R^z$, —N$(R^z)_2$, in which $R^z$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, preferably 2 to 12, in which one or more H atoms may optionally be replaced by F or C.

"Substituted silyl or aryl" preferably means substituted by halogen, —CN, $R^{y1}$, —O$R^{y1}$, —CO—$R^{y1}$, —CO—O—$R^{y1}$, —O—CO—$R^{y1}$ or —O—CO—O—$R^{y1}$, in which $R^{y1}$ has the meaning indicated above.

Particularly preferred substituents L are, for example, F, Cl, CN, $CH_3$, $C_2H_5$, —$CH(CH_3)_2$, $OCH_3$, $OC_2H_5$, $CF_3$, $OCF_3$, $OCHF_2$, $OC_2F_5$, furthermore phenyl.

Above and below "halogen" denotes F, C, Br or I.

Above and below, the terms "alkyl", "aryl", "heteroaryl", etc., also encompass polyvalent groups, for example alkylene, arylene, heteroarylene, etc.

The term "director" is known in prior art and means the preferred orientation direction of the long molecular axes (in case of calamitic compounds) or short molecular axes (in case of discotic compounds) of the liquid-crystalline molecules. In case of uniaxial ordering of such anisotropic molecules, the director is the axis of anisotropy.

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a proportion of the liquid-crystalline molecules are oriented at an angle θ ("tilt angle") between about 80° to 90° relative to the plane of the layer.

The terms "uniform orientation" or "uniform alignment" of a liquid-crystalline material, for example in a layer of the material, mean that the long molecular axes (in case of calamitic compounds) or the short molecular axes (in case of discotic compounds) of the liquid-crystalline molecules are oriented substantially in the same direction. In other words, the lines of liquid-crystalline director are parallel.

The wavelength of light generally referred to in this application is 550 nm, unless explicitly specified otherwise.

The birefringence Δn herein is defined by the following equation $$\Delta n = n_e - n_o$$

wherein $n_e$ is the extraordinary refractive index and $n_o$ is the ordinary refractive index and the effective average refractive index $n_{av.}$ is given by the following equation $$n_{av.} = [(2n_o^2 + n_e^2)/3]^{1/2}$$

The extraordinary refractive index $n_e$ and the ordinary refractive index no can be measured using an Abbe refractometer.

In the present application the term "dielectrically positive" is used for compounds or components with $\Delta\varepsilon > 3.0$, "dielectrically neutral" with $-1.5 \leq \Delta\varepsilon \leq 3.0$ and "dielectrically negative" with $\Delta\varepsilon < -1.5$. Δε is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. Preferably, the concentration is kept at least at 5%, however, to keep the significance of the results as high as possible. The capacitance of the test mixtures is determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

Δε is defined as $(\varepsilon \| - \varepsilon_\perp)$, whereas $\varepsilon_{av.}$ is $(\varepsilon \| + 2\,\varepsilon_\perp)/3$. The dielectric permittivity of the compounds is determined from the change of the respective values of a host medium upon addition of the compounds of interest. The values are extrapolated to a concentration of the compounds of interest of 100%. A typical host medium is ZLI-4792 or ZLI-2857 both commercially available from Merck, Darmstadt.

For the present invention,

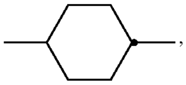, 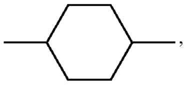,

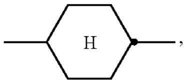, and 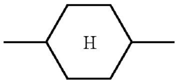

denote trans-1,4-cyclohexylene,

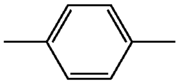 and 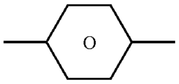

denote 1,4-phenylene.

For the present invention the groups —CO—O—, —COO— —C(=O)O— or —$CO_2$— denote an ester group of formula

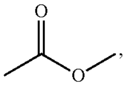, and the groups —O—CO— —OCO—, —OC(=O)—, —$O_2C$— or —OOC— denote an ester group of formula

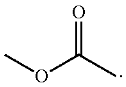.

Furthermore, the definitions as given in C. Tschierske, G. Pelzl and S. Diele, Angew. Chem. 2004, 116, 6340-6368 shall apply to non-defined terms related to liquid crystal materials in the instant application.

DETAILED DESCRIPTION

The invention relates to a LC device comprising at least two opposing transparent substrates, a LC switching layer sandwiched between said opposing substrates comprising a polymer obtainable from one or more photoreactive mesogens of formula I, $$R^{11}\text{-}Sp^{11}\text{-}X^{11}[\text{-}A\text{-}Z]_o\text{-}A^{11}\text{-}CY^{11}{=}CY^{12}[—C{=}O]_x[—O]_y\text{-}A[\text{-}Z\text{-}A]_p—X^{21}\text{-}Sp^{21}\text{-}R^{21} \quad \text{I}$$

wherein $A^{11}$ denotes a radical selected from the following groups:

a) a group consisting of 1,4-phenylene and 1,3-phenylene, wherein, in addition, one or two CH groups are optionally replaced by N and wherein, in addition, one or more H atoms are optionally replaced by L, b) a group selected from the group consisting of

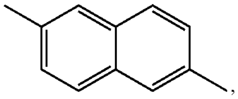
,
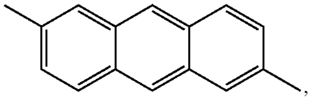
,
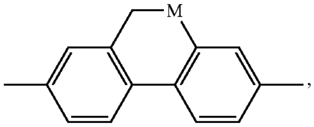
,
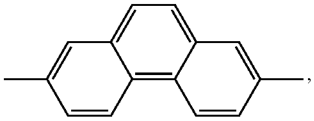
,
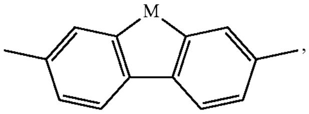
,
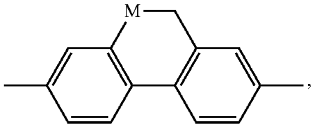
,
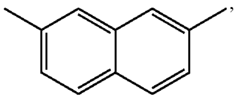
,
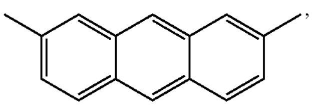
,
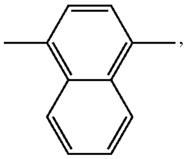
,
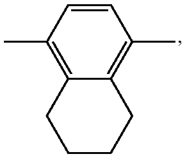
,
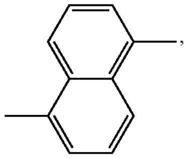
, where, in addition, one or more H atoms in these radicals are optionally replaced by L, and/or one or more double bonds are optionally replaced by single bonds, and/or one or more CH groups are optionally replaced by N, A have each, independently of one another, in each occurrence one of the meanings for $A^{11}$ or a) group consisting of trans-1,4-cyclohexylene, 1,4-cyclohexenylene, wherein, in addition, one or more non-adjacent $CH_2$ groups are optionally replaced by —O— and/or —S— and wherein, in addition, one or more H atoms are optionally replaced by F, or b) a group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, L on each occurrence, identically or differently, denotes —OH, —F, —Cl, —Br, —I, —CN, $—NO_2$, $SF_5$, —NCO, —NCS, —OCN, —SCN, $—C(=O)N(R^z)_2$, $—C(=O)R^z$, $—N(R^z)_2$, optionally substituted silyl, optionally substituted aryl having 6 to 20 C atoms, or straight-chain or branched or cyclic alkyl, alkoxy, alkylcarbonyl, alkoxycarbonyl, alkylcarbonyloxy or alkoxycarbonyloxy having 1 to 25 C atoms, or $X^{21}—Sp^{21}-R^{21}$, M denotes —O—, —S—, $—CH_2—$, $—CHR^z—$ or $—CR^yR^z—$, $R^y$ and $R^z$ each, independently of one another, denote H, CN, F or alkyl having 1-12 C atoms, wherein one or more H atoms are optionally replaced by F, $Y^{11}$ and $Y^{12}$ each, independently of one another, denote H, F, phenyl or optionally fluorinated alkyl having 1-12 C atoms, Z denotes, independently of each other, in each occurrence, a single bond, —COO—, —OCO—, —O—CO—O—, $—OCH_2—$, $—CH_2O—$, $—OCF_2—$, $—CF_2O—$, $—(CH_2)_n—$, $—CF_2CF_2—$, —CH=CH—, —CF=CF—, —CH=CH—COO—, —OCO—CH=CH—, —CO—S—, —S—CO—, —CS—S—, —S—CS—, —S—CSS— or —C≡C—, n denotes an integer between 2 and 8, and p denote each and independently 0, 1 or 2, x and y denote each and independently 0 or 1, however under the condition that if x denotes 0, y cannot denote 1, $X^{11}$ and $X^{21}$ denote independently from one another, in each occurrence a single bond, —CO—O—, —O—CO—, —O—COO—, —O—, —CH=CH—, —C≡C—, $—CF_2—O—$, $—O—CF_2—$, $—CF_2—CF_2—$, $—CH_2—O—$, $—O—CH_2—$, —CO—S—, —S—CO—, —CS—S—, —S—CS—, —S—CSS— or —S—, $Sp^{11}$ and $Sp^{21}$ denote each and independently, in each occurrence a single bond or a spacer group comprising 1 to 20 C atoms, wherein one or more non-adjacent and non-terminal $CH_2$ groups are optionally replaced by —O—, —S—, —NH—, $—N(CH_3)—$, —CO—, —O—CO—, —S—CO—, —O—COO—, —CO—S—, —CO—O—, $—CF_2—$, $—CF_2O—$, $—OCF_2—$ —C(OH)—, —CH(alkyl)-, —CH(alkenyl)-, —CH(alkoxyl)-, —CH(oxaalkyl)-, —CH=CH— or —C≡C—, however in such a way that no two O-atoms are adjacent to one another and no two groups selected from —O—CO—, —S—CO—, —O—COO—, —CO—S—, —CO—O— and —CH=CH— are adjacent to each other, $R^{11}$ denotes P, $R^{21}$ denotes P, halogen, CN, optionally fluorinated alkyl or alkenyl with up to 15 C atoms in which one or more non-adjacent $CH_2$-groups are optionally replaced by —O—, —S—, —CO—, —C(O)O—, —O—C(O)—, O—C(O)—O—, P each and independently from another in each occurrence a polymerizable group, and one or more nematogenic compounds, an electrode structure provided on one or both of the opposing substrates, characterized in that one or more of said substrates correspond to an optical grating or a lens structure or said substrates are additionally provided with an optical grating or a lens structure adjacent to the LC switching layer.

In a preferred embodiment of the invention the utilized substrates are substantially transparent. Transparent materials suitable for the purpose of the present invention are commonly known by the skilled person. In accordance with the invention, the substrates may consist, inter alia, each and independently from another of a polymeric material, of metal oxide, for example ITO and of glass or quartz plates, preferably each and independently of another of glass and/or ITO, in particular glass/glass.

Suitable and preferred polymeric substrates are for example films of cyclo olefin polymer (COP), cyclic olefin copolymer (COC), polyester such as polyethyleneterephthalate (PET) or polyethylene-naphthalate (PEN), polyvinylalcohol (PVA), polycarbonate (PC) or triacetylcellulose (TAC), very preferably PET or TAC films. PET films are commercially available for example from DuPont Teijin Films under the trade name Melinex®. COP films are commercially available for example from ZEON Chemicals L.P. under the trade name Zeonor® or Zeonex®. COC films are commercially available for example from TOPAS Advanced Polymers Inc. under the trade name Topas®.

The substrates can be kept at a defined separation from one another by, for example, spacers, in particular printed spacers, or projecting structures in the layer. Typical spacer materials are commonly known to the expert and are selected, for example, from plastic, silica, epoxy resins, etc.

In a preferred embodiment, the substrates are arranged with a maximum separation in the range from approximately 1 μm to approximately 100 μm from one another, preferably in the range from approximately 1 μm to approximately 75 μm from one another, and more preferably in the range from approximately 1 μm to approximately 50 μm from one another. The LC switching layer is thereby located in the interspace.

Consequently the invention relates to a device as described above and below, wherein the maximum thickness of the LC switching layer is in the range from approximately 1 μm to approximately 100 μm from one another, preferably in the range from approximately 1 μm to approximately 75 μm from one another, and more preferably in the range from approximately 1 μm to approximately 50 μm from one another.

The light modulation element in accordance with the present invention comprises an electrode structure capable of electrically switching the LC switching layer.

In a first preferred embodiment the electrodes are provided on each of the opposing substrates, in order to allow the application of an electric field, which is substantially perpendicular to the substrates or the LC Switching layer. Preferably, the electrode structure is provided on each of the opposing substrates as an electrode layer. It has to be understood that the present invention refers to any kind of electrode configurations suitable for generating an electric field substantially perpendicular to a surface of the substrate mentioned above, such as electrode structures commonly known for the VA mode, or even ITO doped substrate materials.

In a preferred embodiment, the light modulation element comprises at least one dielectric layer, which is provided on the electrode structure.

In another preferred embodiment, the light modulation element comprises at least two dielectric layers, which are provided on the opposing electrode structures.

Suitable transparent electrode materials are commonly known to the expert, as for example electrode structures made of metal or metal oxides, such as, for example transparent indium tin oxide (ITO), which is preferred according to the present invention.

Thin films of ITO are commonly deposited on substrates by physical vapour deposition, electron beam evaporation, or sputter deposition techniques.

Typical dielectric layer materials are commonly known to the expert, such as, for example, SiOx, SiNx, Cytop, Teflon, and PMMA.

The dielectric layer materials can be applied by conventional coating techniques like spin coating, roll-coating, blade coating, or vacuum deposition such as PVD or CVD. It can also be applied to the substrate or electrode layer by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

In a second preferred embodiment, one of the substrates includes a pixel electrode and a common electrode for generating an electric field substantially parallel to the surface of the first substrate. Various kinds of displays having at least two electrodes on one substrate are known to the skilled person wherein the most significant difference is that either both the pixel electrode and the common electrode are structured, as it is typical for IPS displays, or only the pixel electrode is structured and the common electrode is unstructured, which is the case for FFS displays.

It has to be understood that the present invention refers to any kind of electrode configurations suitable for generating an electric field substantially parallel to a surface of the substrate mentioned above, i.e. IPS as well as FFS displays.

Consequently, the invention further relates to a device as described above and below, wherein the electrode structure is selected from interdigitated electrodes, IPS electrodes, FFS electrodes or comb like electrodes.

The invention further relates to a device as described above and below wherein one or more substrates, or one or more substrates including the electrode structure are provided with a plano-concave lens structure, or a plano-convex lens structure or a refractive Fresnel lens structure, or a diffractive Fresnel lens structure.

It has to be understood that the present invention also refers to any kind of substrates or substrate arrays that can form itself a lens structure, e.g. flexible substrates that can form a lens structure after assembly of the cell, such as curved substrates.

Typical and preferred flexible substrate materials are PET (polyethylene terephthalate), PEN (polyethylene naphtalate), TAC (Triacetyl cellulose), PC (polycarbonate), PES (polyethersulfone), COC (Cyclo Olefin Copolymers) or COP Polyarylate.

In a preferred embodiment, the isotropic material of the lens structure is chosen to have one of the two possible refraction indices, i.e. $n_0$ (the ordinary ray refractive index perpendicular to the axis of anisotropy), $n_e$ (the extraordinary ray refractive index parallel to the axis of anisotropy), and by choosing a certain light polarization and choosing negative or positive air focal distance of the isotropic material of the lens structure, a lens effect can be associated with the birefringent or optical anisotropic LC switching layer.

The LC switching layer is defined by its $n_o$ and $n_e$ values. It is a matter of routine skill to approximately match the appropriate refractive index ($n_o$ or $n_e$) of the LC switching layer with the refractive index of the isotropic material of the lens structure.

Many transparent polymers, e.g. polymer films obtainable from reactive mesogens or polymerizable liquid crystals, (functionalized) polycarbonates (n≈1.58); polyimides; fluorinated polyimides (n≈1.52-1.54) such as the OPI series polyimides from the Hitachi company; fluorocarbons such as Teflon®, Teflon AF® and Cytop® (n≈1.34-1.38), silicon polymers such as Sylgard® 184 (n≈1.43); acrylic glass (n≈1.49); polycarbonate (n≈1.58) such as Makrolon®; PMMA (n≈1.48); PET (n≈1.57); mixtures of such polymers, as for instance disclosed in U.S. Pat. No. 6,989,190 A1; flint glass (n≈1.52-1.92); crown glass (n≈1.48-1.75) and many more are readily available to the skilled person. Furthermore, some polymers can be mixed to achieve an averaged effective refractive index, and this can be used to enable the desired refractive index to be obtained.

The refractive index match is such that difference between the refractive index $n_e$ or $n_o$ of the LC switching layer and the refractive index of isotropic material of the lens structure (i.e. the error in the match) is smaller than 5%. More preferably, the error in the match is less than 2% or most preferably less than 1%.

A lens effect is provided by generating a difference in refractive index between the isotropic material of the lens structure and one of the refractive indices of the LC switching layer. Therefore, the invention further relates to a device as described above and below, characterized in that it is a beam focusing device. Preferably, the refractive index difference should be as large as possible, so that the device is as shallow as possible.

The general substrate stack, such as the substrate as such, the electrode structure and the lens structure, of the device according to the invention is commonly known by the expert. Exemplarily, a substrate stack utilizing a Suitable Fresnel lens structures and corresponding substrate stacks are for example disclosed in US 2007/0182915 or GB201810565.

Further lens structures or substrates are commonly known to the expert and in particular commercially available, such as, for example Fresnel lenses: FRP0510, f=10 mm; FRP125, f=25 mm; or FRP232, f=32 mm; available from Thorlabs, Germany;

Plano-convex lenses: UV Fused Silica; N-SF11, lenses made of $CaF_2$, $MgF_2$, Si, $BaF_2$, ZnSe, Ge, PTFE, THz Lenses, all available from Thorlabs, Germany;

Bi-Convex lenses, such as N-BK7, UV Fused Silica, corresponding lenses made of $CaF_2$, ZnSe; all available from Thorlabs, Germany; Plano-concave lenses: N-BK7, UV Fused Silica N-SF11, corresponding lenses made of $CaF_2$, or ZnSe, all available from Thorlabs, Germany; Bi-concave lenses, N-BK7 and N-SF11, corresponding lenses made of $CaF_2$, or ZnSe, all available from Thorlabs, Germany.

In another preferred embodiment, the device according to the present invention is characterized in that one or more substrates are provided with a surface relief grating, a blazed grating, or a volume grating, or a Pancharatnam-Berry grating.

The general substrate stack, such as the substrate as such, the electrode structure and the grating structure, of the device according to the invention is commonly known by the expert.

Suitable grating structures or substrates are, in particular, commercially available, such as, for example Surface relief gratings, GR13-0305, GR25-0305, GR50-0305, GR13-0605, GR25-0605, GR50-0605, GR13-1205, GR25-1205 or GR50-1205 all available from Thorlabs, Germany;

Volume Bragg gratings: LuxxMaster® VBG® available from PD-LD, Germany; or disclosed in, for example, WO 2016/019123 (Pancharatnam-Berry gratings or Bragg Polarization gratings)

In a preferred embodiment, the material of the grating structure is chosen to have one of the two possible refraction indices, i.e. $n_0$ (the ordinary ray refractive index perpendicular to the axis of anisotropy), $n_e$ (the extraordinary ray refractive index parallel to the axis of anisotropy), and by choosing a certain light polarization and choosing negative or positive air focal distance of the isotropic material of the lens structure, a deflection or refraction of light effect can be associated with the birefringent or optical anisotropic LC switching layer.

The LC switching layer is defined by its $n_o$ and $n_e$ values. It is a matter of routine skill to approximately match the appropriate refractive index ($n_o$ or $n_e$) of the LC switching layer with the refractive index of the isotropic material of the grating structure.

For example, transparent polymers, e.g. polymer films obtainable from reactive mesogens or polymerizable liquid crystals, (functionalized) polycarbonates (n≈1.58); polyimides; fluorinated polyimides (n≈1.52-1.54) such as the OPI series polyimides from the Hitachi company; fluorocarbons such as Teflon®, Teflon AF® and Cytop® (n≈1.34-1.38), silicon polymers such as Sylgard® 184 (n≈1.43); acrylic glass (n≈1.49); polycarbonate (n≈1.58) such as Makrolon®; PMMA (n≈1.48); PET (n≈1.57); mixtures of such polymers, as for instance disclosed in U.S. Pat. No. 6,989,190 A1; flint glass (n≈1.52-1.92); crown glass (n≈1.48-1.75) and many more are readily available to the skilled person. Furthermore, some polymers can be mixed to achieve an averaged effective refractive index, and this can be used to enable the desired refractive index to be obtained.

The refractive index match is such that the difference between the refractive index $n_e$ or $n_o$ of the LC switching layer and the refractive index of isotropic material of the grating structure (i.e. the error in the match) is smaller than 5%. More preferably, the error in the match is less than 2% or most preferably less than 1%.

The device can be operated in a binary mode. For example, when an electric field is present, the refractive indices of the grating and LC switching layer are different. Hence, a strong diffraction is produced by the refractive index/phase difference between the grating and LC switching layer when the voltage is in the off state. The effective diffraction efficiency may be determined e.g. by the parameters of the (blazed) grating, such as grating depth, grating period, and (blaze) profile.

When the electric field is applied between the electrode structure, the refractive index of the liquid crystal is decreased. At a specified driving voltage, "index matching" occurs between the grating material, and the LC switching layer. When this happens, the entire device can then be considered as an optically flat plate. Little or no diffraction occurs in this state.

Hence, the device can be viewed as an electrically controlled binary switch. The incident beam can either be deflected when in the off state, or undeflected when in the on state.

Therefore, the invention further relates to a device that is characterized in that it is a LC beam steering device.

The present invention further relates to a method of production of a device as described above or below, comprising one or more of the following steps:

- providing an electrode structure on one or more of the substrates, providing an optical grating or a lens structure on one or more substrates, assembling a cell,
- filling the cell with the LC medium comprising one or more photoreactive mesogens of formula I and one or more nematogenic compounds,
- irradiating the cell with linearly polarised light,
- curing the polymerizable compounds of the LC medium by irradiation with ultraviolet light or visible light having a wavelength of 450 nm or below.

According to the invention, a suitable LC medium comprises one or more monomeric compounds or photoreactive mesogens of formula I, $$R^{11}\text{-}Sp^{11}\text{-}X^{11}[\text{-}A\text{-}Z]_o\text{-}A^{11}\text{-}CY^{11}{=}CY^{12}[{-}C{=}O]_x[{-}O]_y\text{-}A[\text{-}Z\text{-}A]_p{-}X^{21}\text{-}Sp^{21}\text{-}R^{21} \quad \text{I}$$

wherein $R^{11}$, $R^{21}$, $A^{11}$, A, Z, $X^{11}$, $X^{21}$, $Y^{11}$, $Y^{12}$, $Sp^{11}$, $Sp^{21}$, o, p, x and y have one of the meanings as given above under formula I.

Suitable and preferred compounds of formula I are for example disclosed in EP 19178130.1, EP 18168779.9, EP 18168775.7, EP 18168774.0, EP 18168776.5, EP 18199489.8, or EP 18211999.0.

In the instant application, polymerizable groups (P) are groups that are suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2{=}CW^1{-}CO{-}O{-}$, $CH_2{=}CW^1{-}CO{-}$,

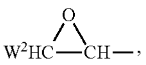 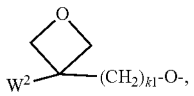 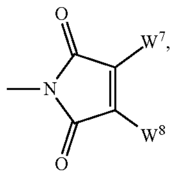

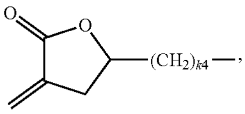

$CH_2{=}CW^2{-}(O)_{k3}{-}$, $CW^1{=}CH{-}CO{-}(O)_{k3}{-}$, $CW^1{=}CH{-}CO{-}NH{-}$, $CH_2{=}CW^1{-}CO{-}NH{-}$, $CH_3{-}CH{=}CH{-}O{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $HO{-}CW^2W^3{-}$, $HS{-}CW^2W^3{-}$, $HW^2N{-}$, $HO{-}CW^2W^3{-}NH{-}$, $CH_2{=}CW^1{-}CO{-}NH{-}$, $CH_2{=}CH{-}(COO)_{k1}\text{-}Phe\text{-}(O)_{k2}{-}$, $CH_2{=}CH{-}(CO)_{k1}\text{-}Phe\text{-}(O)_{k2}{-}$, $Phe{-}CH{=}CH{-}$, $HOOC{-}$, $OCN{-}$ and $W^4W^5W^6Si{-}$, wherein $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, C or alkyl having 1 to 5 C atoms, Phe denotes 1,4-phenylene, which is optionally substituted by one or more radicals L as defined above, $k_1$, $k_2$ and $k_3$ each, independently of one another, denote 0 or 1, $k_3$ preferably denotes 1, and $k_4$ denotes an integer from 1 to 10.

Further preferred, P denotes a group

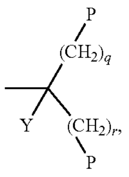

preferably a group

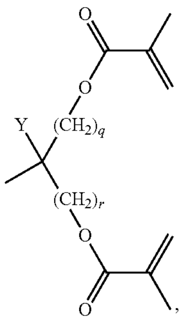 , or 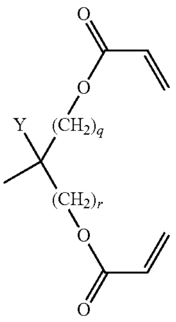

In which

- Y denotes H, F, phenyl or optionally fluorinated alkyl having 1-12 C atoms, preferably H, methyl, ethyl, propyl, butyl, more preferably H or methyl, in particular H, and
- q and r are each and independently an integer between 1 and 12.

Particularly preferred groups P are selected from the group consisting of $CH_2{=}CW^1{-}CO{-}O{-}$, in particular $CH_2{=}CH{-}CO{-}O{-}$, $CH_2{=}C(CH_3){-}CO{-}O{-}$ and $CH_2{=}CF{-}CO{-}O{-}$, furthermore $CH_2{=}CH{-}O{-}$, $(CH_2{=}CH)_2CH{-}O{-}CO{-}$, $(CH_2{=}CH)_2CH{-}O{-}$,

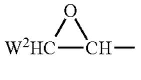 and 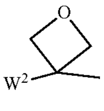

or a group

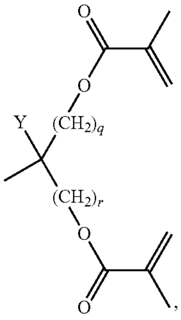, or 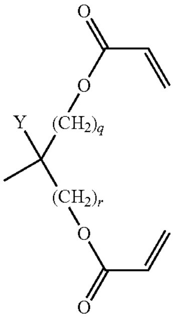

Y denotes H or methyl, in particular H.

q, r are each and independently an integer between 1 and 12.

Very particularly preferred groups P are selected from the group consisting of acrylate, methacrylate, fluoroacrylate, furthermore vinyloxy, chloroacrylate, oxetane, epoxide groups and a group,

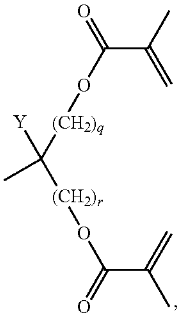, or 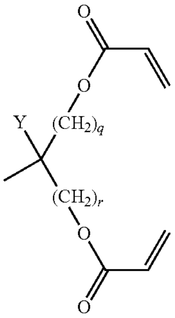

Y denotes H or methyl, in particular H, and of these preferably an acrylate or methacrylate group or a group, q, r are each and independently an integer between 1 and 12.

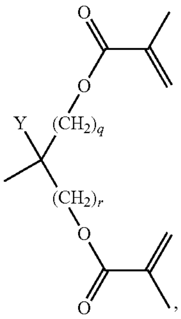, or 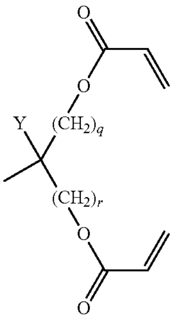

wherein Y denotes H or methyl, and q, r are each and independently an integer between 1 and 12.

. . .

The compounds of formula I are preferably selected from compounds of the following sub-formulae,

I-1

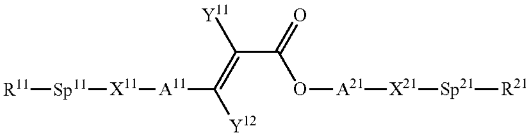

I-2

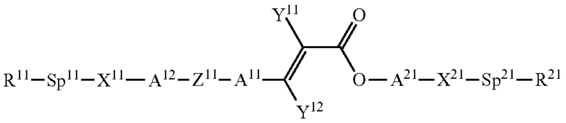

I-3

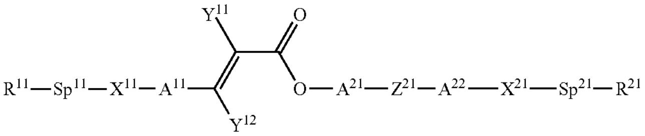

I-4

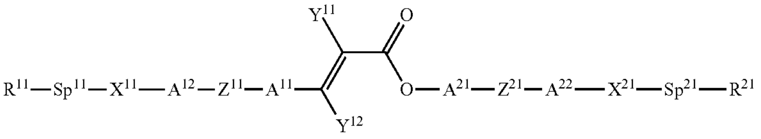

I-5

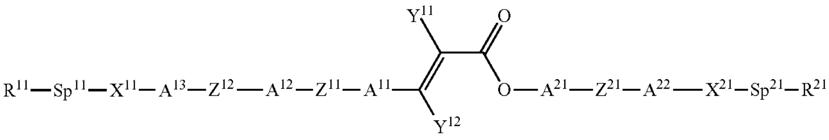

-continued
I-6
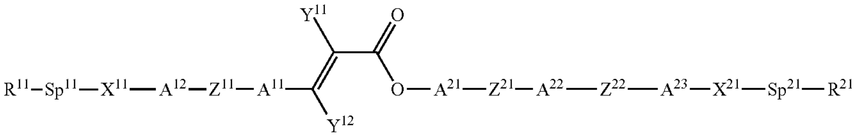
I-7
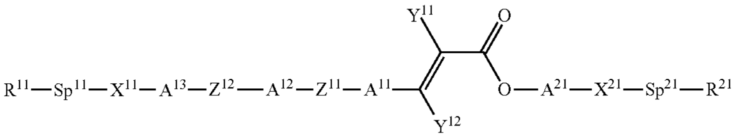
I-8
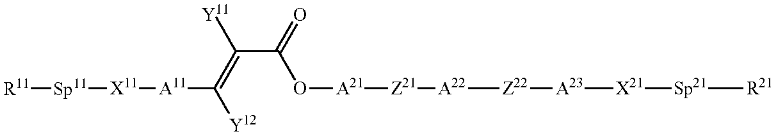
I-9
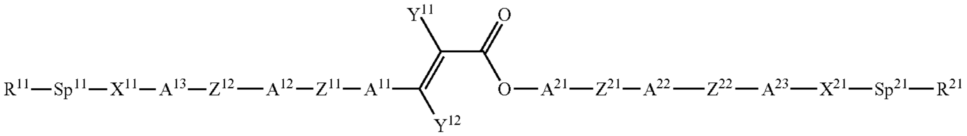
I-10
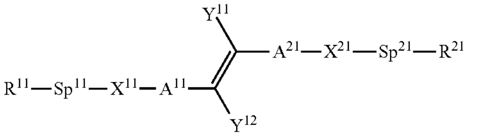
I-11
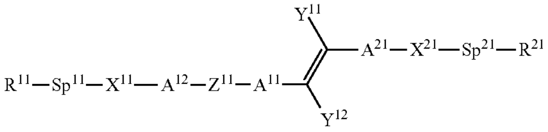
I-12
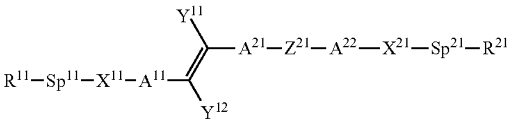
I-13
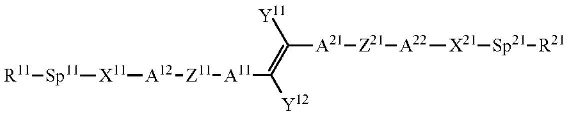
I-14
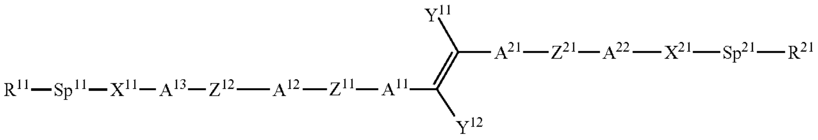
I-15
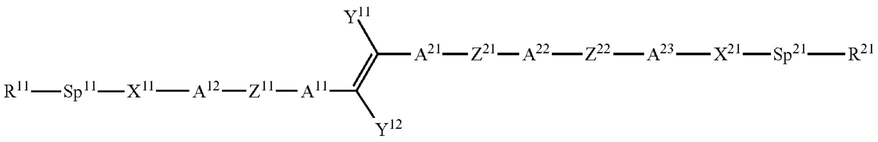
I-16
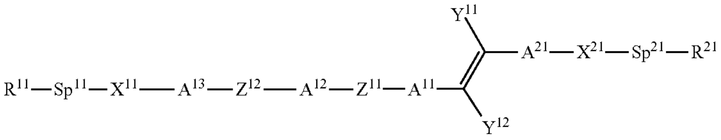
I-17
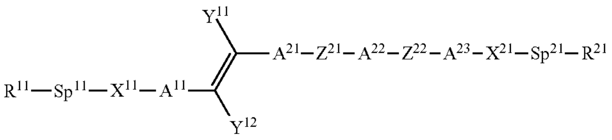

-continued

I-18

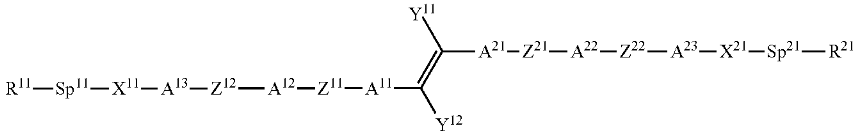

I-19

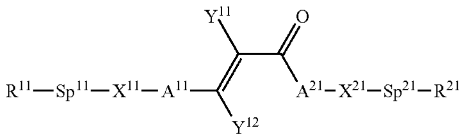

I-20

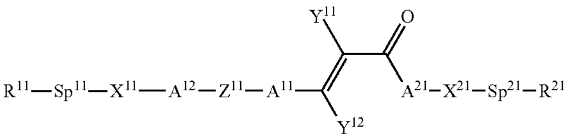

I-21

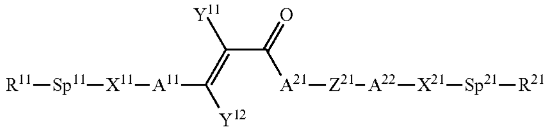

I-22

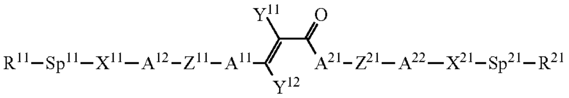

I-23

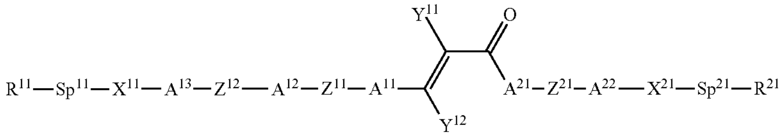

I-24

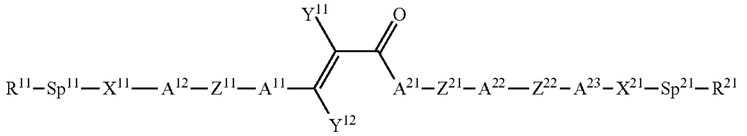

I-25

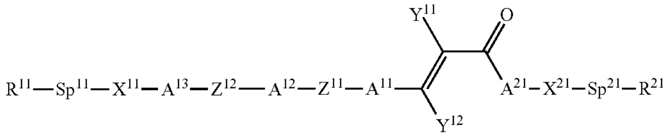

I-26

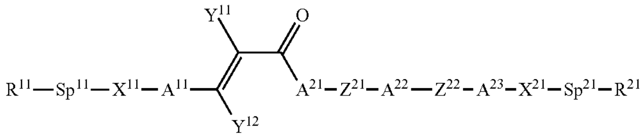

I-27

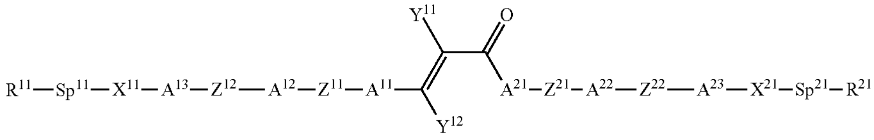

wherein $R^{11}$, $R^{21}$, $A^{11}$, $X^{11}$, $X^{21}$, $Y^{11}$, $Y^{12}$, $Sp^{11}$, and $Sp^{21}$ have one of the meanings as given above in formula I, $A^{12}$ to $A^{23}$ have one of the meanings for A in formula I, $A^{11}$ has one of the meanings as given above under formula I, and $Z^{11}$ to $Z^{22}$ have one of the meanings for Z as given above under formula I.

$A^{11}$ denotes preferably denotes 1,4-phenylene and 1,3-phenylene, wherein, in addition, one or two CH groups are optionally replaced by N and wherein, in addition, one or more H atoms are optionally replaced by L, as given above under formula I.

$A^{12}$ to $A^{23}$ have each and independently one of the meanings for A in formula I and preferably denotes 1,4-phenylene and 1,3-phenylene, wherein, in addition, one or two CH groups are optionally replaced by N and wherein, in addition, one or more H atoms are optionally replaced by L, as given above under formula I.

L for the parameter $A^{11}$ to $A^{23}$ preferably denotes on each occurrence, identically or differently —OH, —F, —Cl, —Br, —I, —CN, —$NO_2$, $SF_5$, —NCO, —NCS, —OCN, —SCN, —C(═O)N($R^z$)$_2$, —C(═O)$R^z$, —N($R^z$)$_2$, or straight-chain or branched or cyclic alkyl, alkoxy, alkylcarbonyl, alkoxycarbonyl, alkylcarbonyloxy or alkoxycarbonyloxy having 1 to 25 C atoms, more preferably —OH, —F, —CN, —NCS, —OCN, —SCN, or straight-chain or branched or cyclic alkyl, alkoxy, alkylcarbonyl, alkoxycarbonyl, alkylcarbonyloxy or alkoxycarbonyloxy having 1 to 12 C atoms.

More preferably $A^{11}$ to $A^{23}$ preferably denotes on each occurrence, identically or differently the group

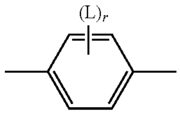

which is each and independently

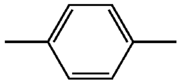 or 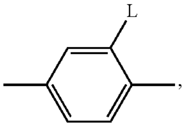,

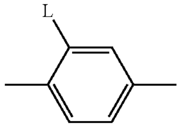 or 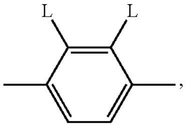, furthermore

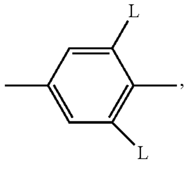, 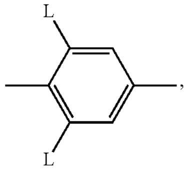,

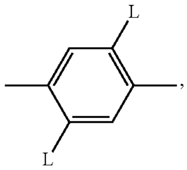, or 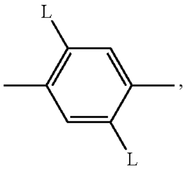, wherein L is preferably F, Cl, $CH_3$, $OCH_3$ and $COCH_3$ or alkylene or alkoxylene having 1 to 6 C Atoms.

$Y^{11}$ and $Y^{12}$ preferably denotes each, independently of one another, H, or F, more preferably H.

$Z^{11}$ to $Z^{22}$ preferably denotes, independently of each other, in each occurrence, a single bond, —COO—, —OCO—, —O—CO—O—, $—OCH_2—$, $—CH_2O—$, $—OCF_2—$, $—CF_2O—$, $—(CH_2)_n—$, $—CF_2CF_2—$, —CH═CH—, —CF═CF—, —CH═CH—COO—, —OCO—CH═CH—, or —C≡C—, more preferably —COO—, —OCO—, —O—CO—O—, $—OCF_2—$, $—CF_2O—$, $—CF_2CF_2—$.

$X^{11}$ and $X^{21}$ denote independently from one another, in each occurrence a single bond, —CO—O—, —O—CO—, —O—COO—, —O—, —CH═CH—, —C≡C—, $—CF_2—O—$, $—O—CF_2—$, $—CF_2—CF_2—$, $—CH_2—O—$, $—O—CH_2—$, —CO—S—, —S—CO—, —CS—S—, —S—CS—, —S—CSS— or —S—, more preferably —CO—O—, —O—CO—, —O—, in particular 0.

$Sp^{11}$ and $Sp^{21}$ denote each and independently, in each occurrence a single bond or a spacer group comprising 1 to 12 C atoms, wherein one or more non-adjacent and non-terminal $CH_2$ groups are optionally replaced by —O—, —S—, —NH—, $—N(CH_3)—$, —CO—, —O—CO—, —S—CO—, —O—COO—, —CO—S—, —CO—O—, $—CF_2—$, $—CF_2O—$, $—OCF_2—$ —C(OH)—, —CH(alkyl)-, —CH(alkenyl)-, —CH(alkoxyl)-, —CH(oxaalkyl)-, —CH═CH— or —C≡C—, however in such a way that no two O-atoms are adjacent to one another and no two groups selected from —O—CO—, —S—CO—, —O—COO—, —CO—S—, —CO—O— and —CH═CH— are adjacent to each other, preferably straight chain alkyl comprising 1 to 20 C atoms.

$R^{21}$ preferably denotes P.

The compounds of formula I and subformulae thereof are preferably synthesised according to or in analogy to the procedures described in WO 2017/102068 and JP 2006-6232809:

The medium preferably comprises from 0.01 to 10%, particularly preferably from 0.05 to 5% and most preferably from 0.1 to 3% of compounds of formula I.

The medium preferably comprises one, two or three, more preferably one or two and most preferably one compound of the formula I according to the invention.

In a preferred embodiment of the present invention the LC medium comprises one or more nematogenic compounds with negative dielectric anisotropy. Preferred embodiments of such an LC medium are those of sections a)-z) below:

a) LC medium which comprises one or more compounds of the formulae CY and/or PY:

CY

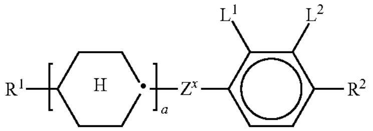

PY

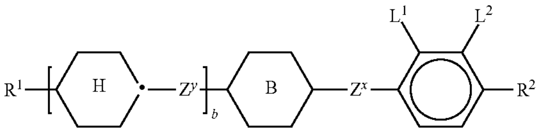

wherein a denotes 1 or 2, b denotes 0 or 1,

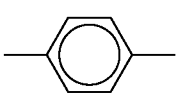 or 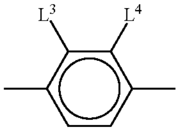

denotes

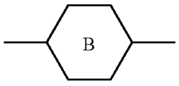

$R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $Z^x$ and $Z^y$ each, independently of one another, denote $—CH_2CH_2—$, $—CH{=}CH—$, $—CF_2O—$, $—OCF_2—$, $—CH_2O—$, $—OCH_2—$, $—CO—O—$, $—O—CO—$, $—C_2F_4—$, $—CF{=}CF—$, $—CH{=}CH—CH_2O—$ or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

CY1

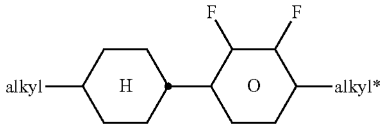

CY2

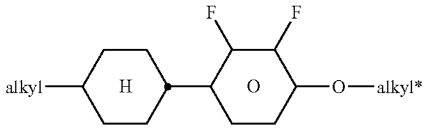

CY3

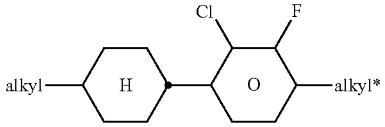

CY4

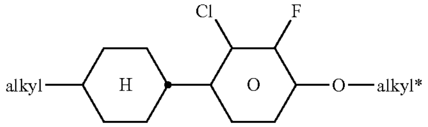

CY5

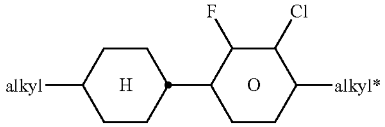

CY6

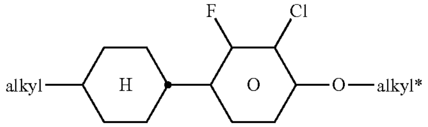

CY7

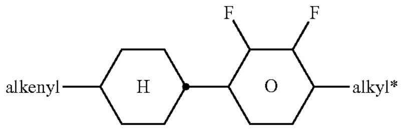

CY8

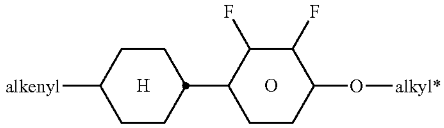

CY9

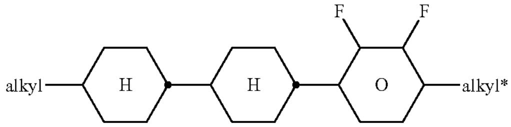

-continued

CY10

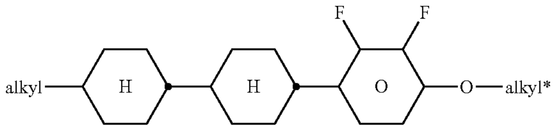

CY11

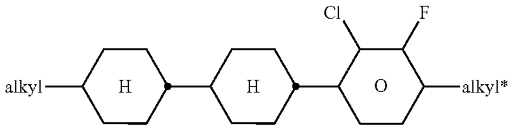

CY12

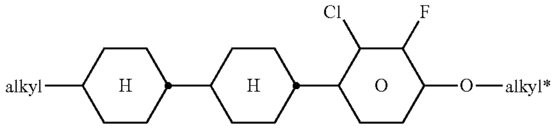

CY13

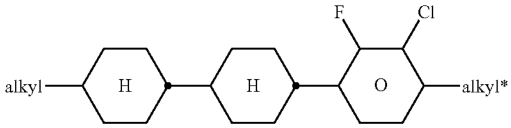

CY14

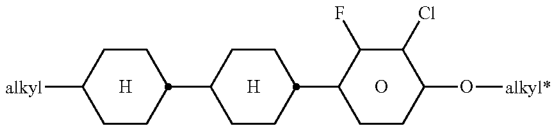

CY15

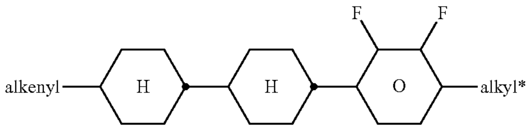

CY16

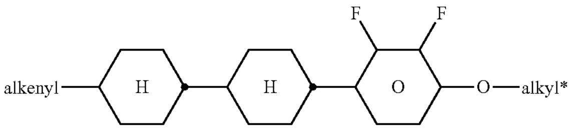

CY17

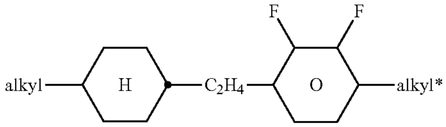

CY18

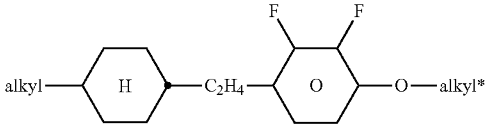

CY19

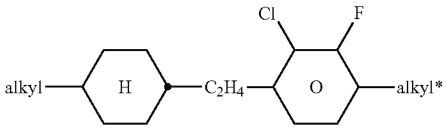

-continued

CY20

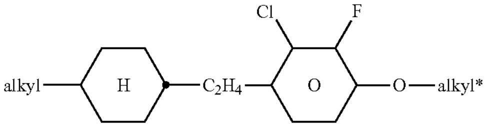

CY21

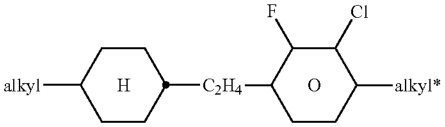

CY22

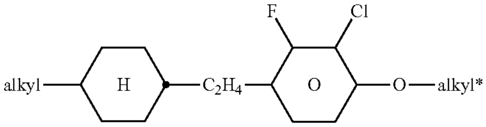

CY23

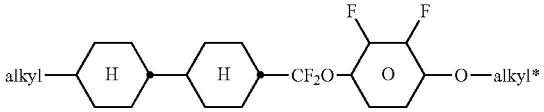

CY24

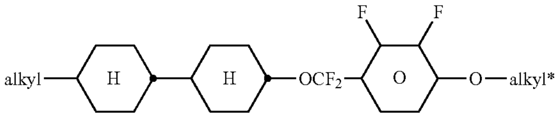

CY25

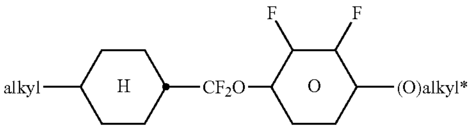

CY26

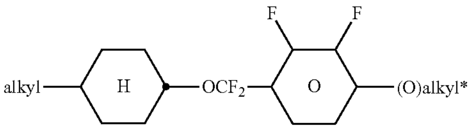

CY27

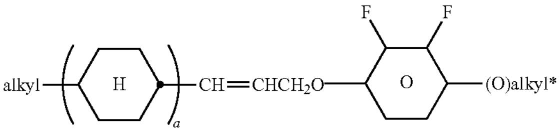

CY28

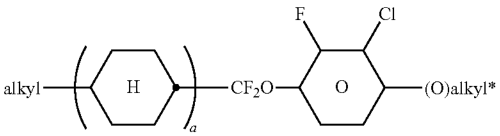

CY29

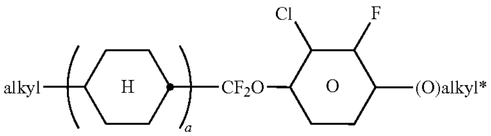

-continued

CY30

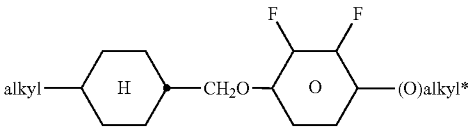

CY31

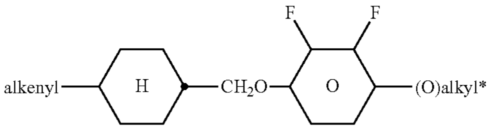

CY32

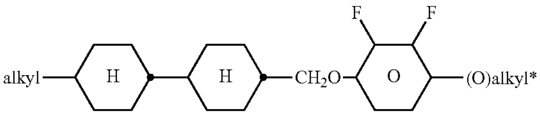

CY33

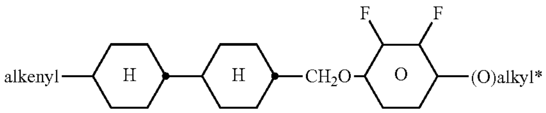

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

The compounds of the formula PY are preferably selected from the group consisting of the following sub-formulae:

PY1

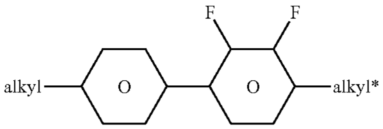

PY2

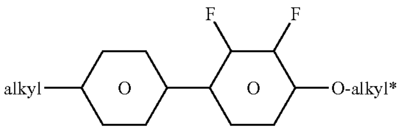

PY3

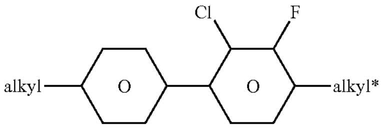

PY4

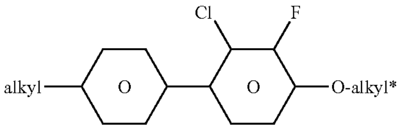

-continued

PY5

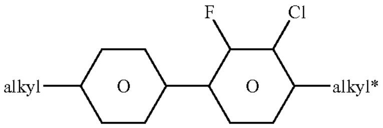

PY6

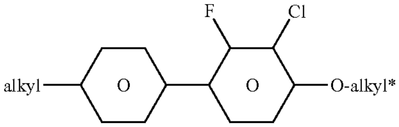

PY7

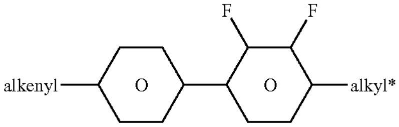

PY8

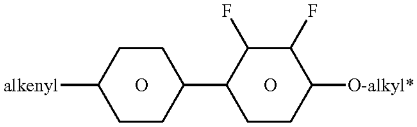

PY9

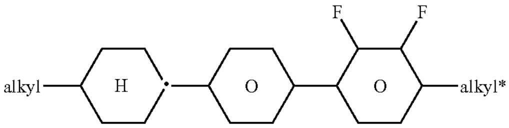

PY10

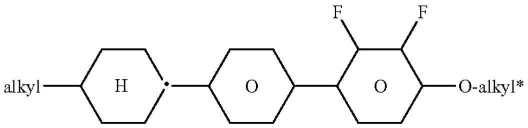

PY11

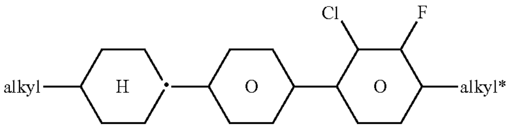

PY12

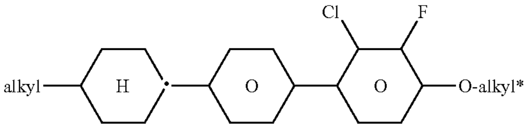

PY13

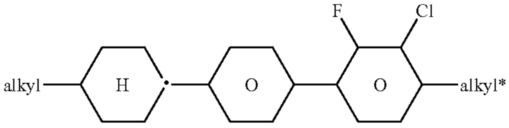

PY14

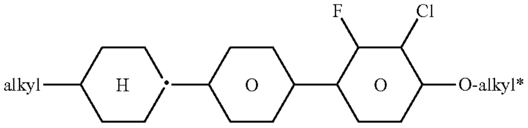

-continued

PY15

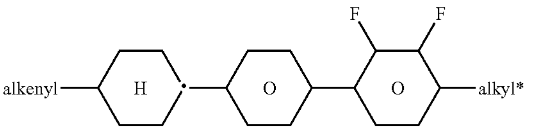

PY16

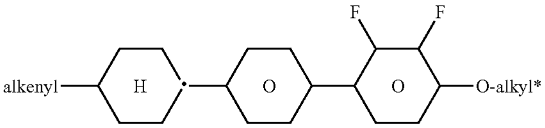

PY17

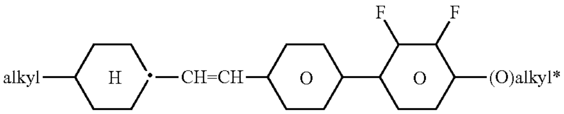

PY18

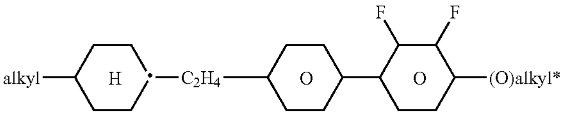

PY19

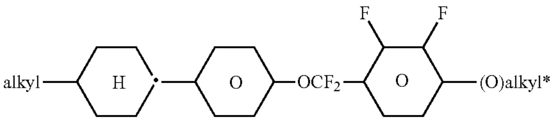

PY20

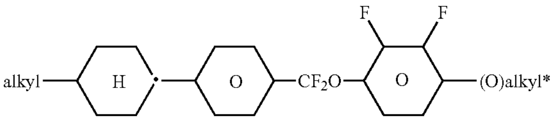

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

b) LC medium which additionally comprises one or more compounds of the following formula:

ZK

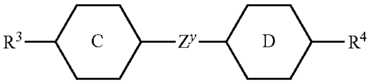

in which the individual radicals have the following meanings:

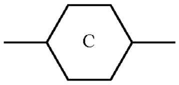

denotes

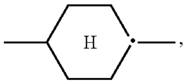, 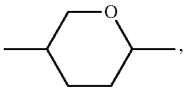, 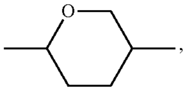, 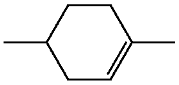 or 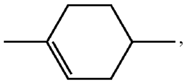, 

denotes

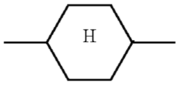 or 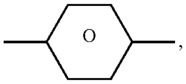, $R^3$ and $R^4$ each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^y$ denotes $—CH_2CH_2—$, —CH═CH—, $—CF_2O—$, $—OCF_2—$, $—CH_2O—$, $—OCH_2—$, —CO—O—, —O—CO—, $—C_2F_4—$, —CF═CF—, —CH═CH—$CH_2O$— or a single bond, preferably a single bond.

The compounds of the formula ZK are preferably selected from the group consisting of the following sub-formulae:

ZK1

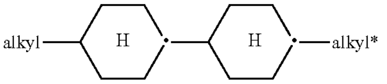

ZK2

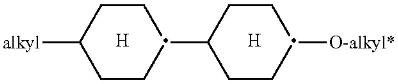

ZK3

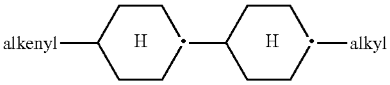

ZK4

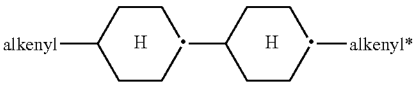

ZK5

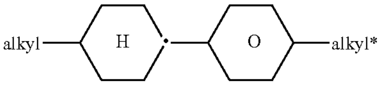

ZK6

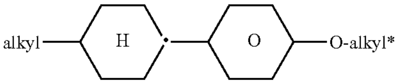

ZK7

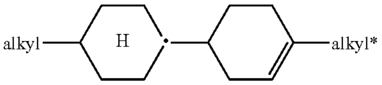

-continued

ZK8

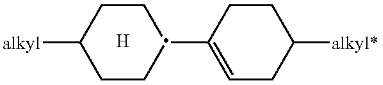

ZK9

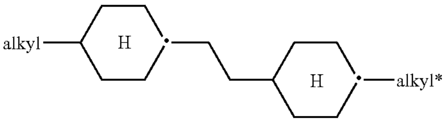

ZK10

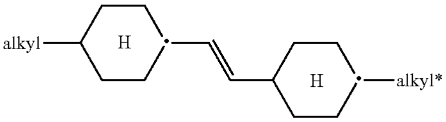

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Especially preferred are compounds of formula ZK1 and ZK3.

Particularly preferred compounds of formula ZK are selected from the following sub-formulae:

ZK1a

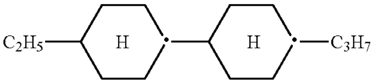

ZK1b

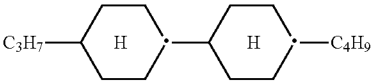

ZK1c

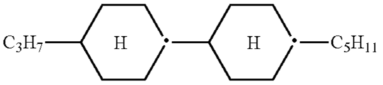

ZK3a

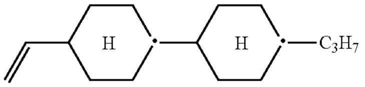

ZK3b

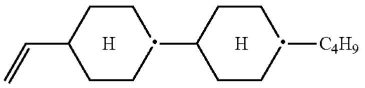

ZK3c

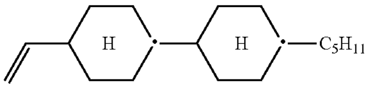

ZK3d

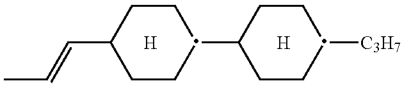

ZK3e

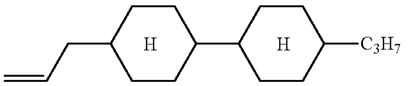

-continued

ZK3f

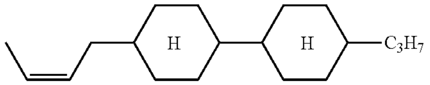

ZK3g

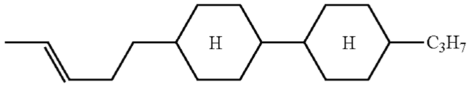

wherein the propyl, butyl and pentyl groups are straight-chain groups.

Most preferred are compounds of formula ZK1a and ZK3a.

c) LC medium which additionally comprises one or more compounds of the following formula:

DK

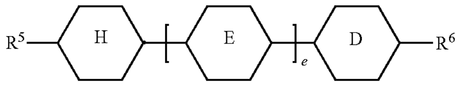

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms,

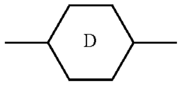

denotes

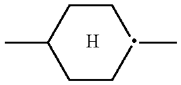 or 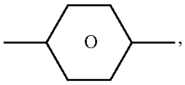,

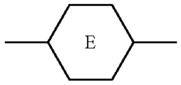

denotes

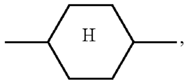, 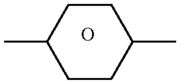 or

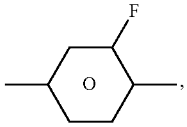, and e denotes 1 or 2.

The compounds of the formula DK are preferably selected from the group consisting of the following sub-formulae:

DK1

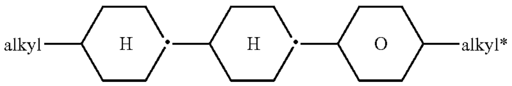

DK2

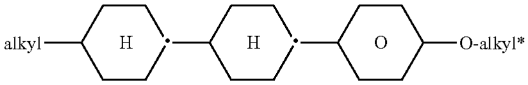

DK3

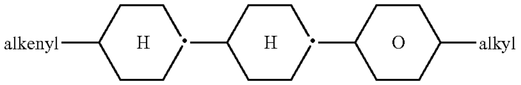

DK4

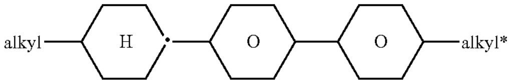

DK5

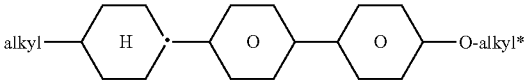

DK6

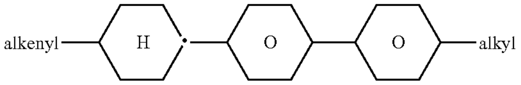

DK7

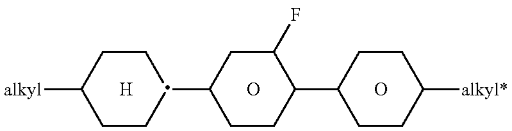

DK8

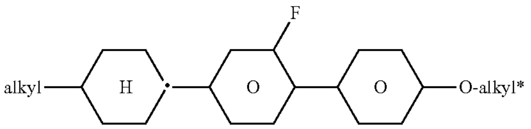

DK9

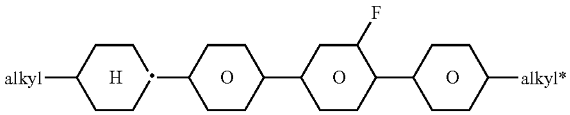

DK10

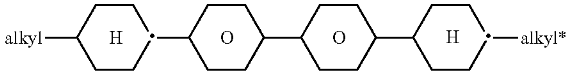

DK11

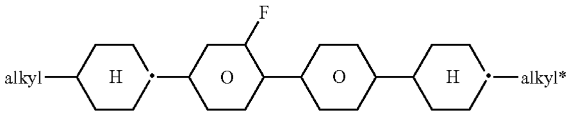

DK12

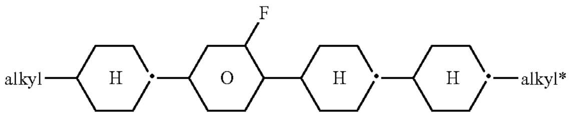

in which alkyl and alkyl* each, independently of one another, denote a straight-chain alkyl radical having 1-6

C atoms, and alkenyl denotes a straight-chain alkenyl radical having 2-6 C atoms. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

d) LC medium which additionally comprises one or more compounds of the following formula:

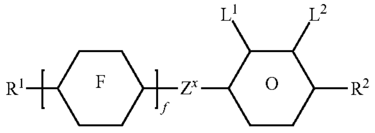

LY in which the individual radicals have the following meanings:

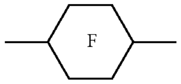

denotes

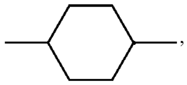,
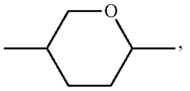,
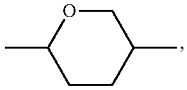,
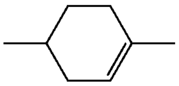 or

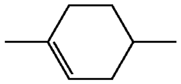

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ denotes $—CH_2CH_2—$, —CH=CH—, $—CF_2O—$, $—OCF_2—$, $—CH_2O—$, $—OCH_2—$, —CO—O—, —O—CO—, $—C_2F_4—$, —CF=CF—, $—CH{=}CH—CH_2O—$ or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1

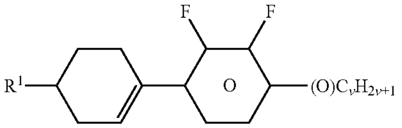

LY2

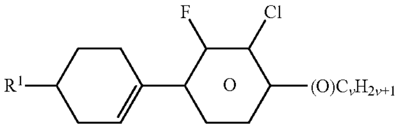

LY3

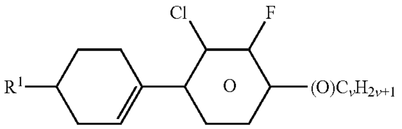

LY4

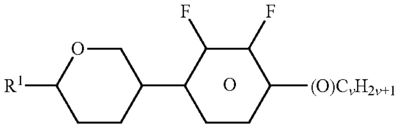

LY5

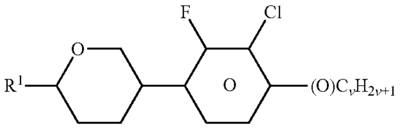

LY6

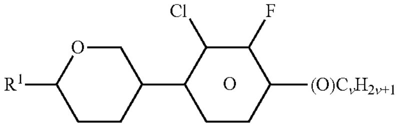

LY7

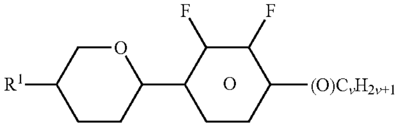

LY8

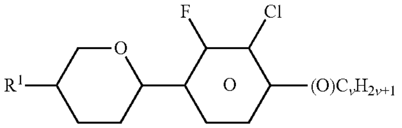

LY9

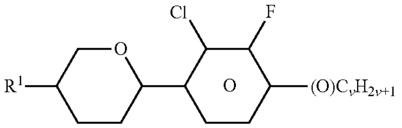

LY10

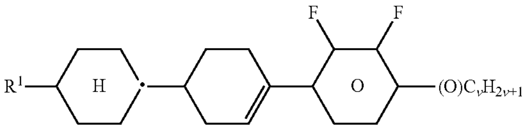

LY11

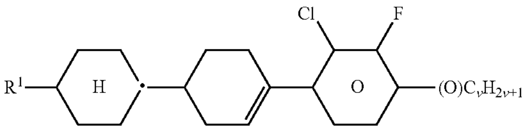

-continued

LY12

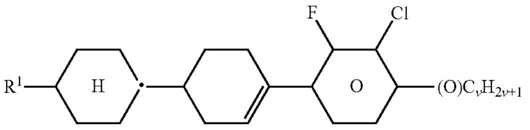

LY13

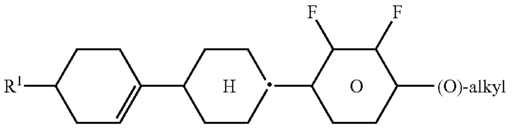

LY14

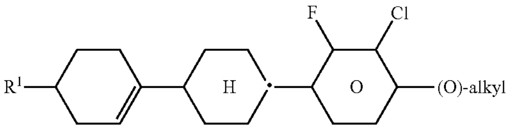

LY15

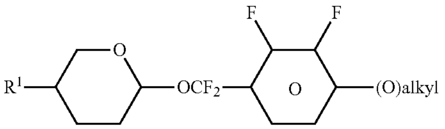

LY16

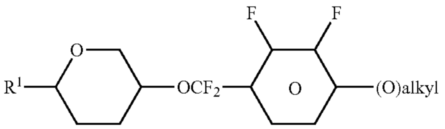

LY17

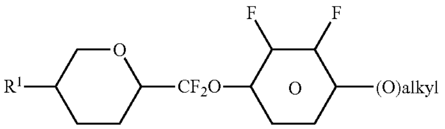

LY18

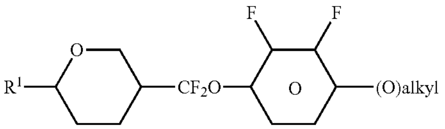

LY19

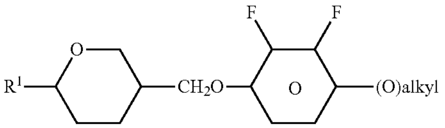

LY20

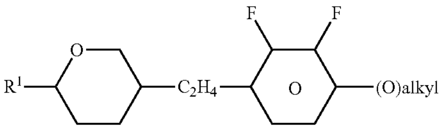

LY21

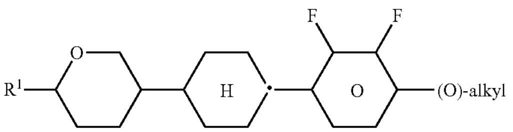

LY22

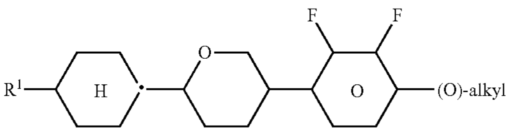

-continued

LY23

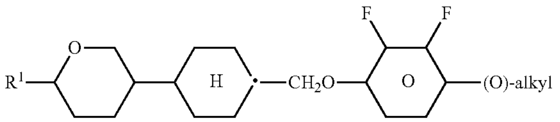

LY24

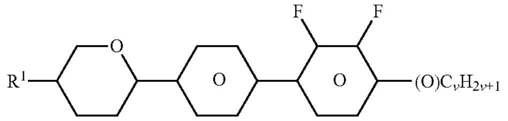

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n-C_3H_7$, $n-C_4He$, $n-C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

e) LC medium which additionally comprises one or more compounds selected from the group consisting of the following formulae:

G1

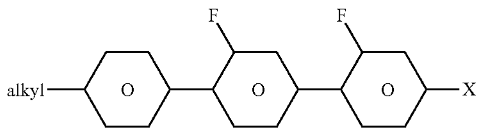

G2

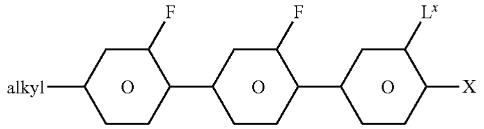

G3

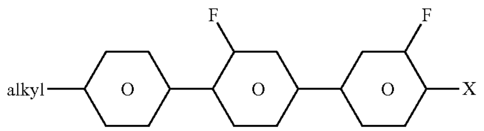

G4

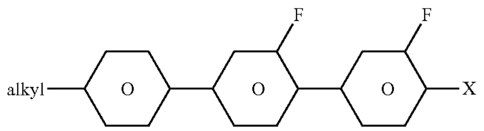

in which alkyl denotes $C_{1-6}$-alkyl, $L^x$ denotes H or F, and X denotes F, Cl, $OCF_3$, $OCHF_2$ or $OCH{=}CF_2$. Particular preference is given to compounds of the formula G1 in which X denotes F.

f) LC medium which additionally comprises one or more compounds selected from the group consisting of the following formulae:

Y1

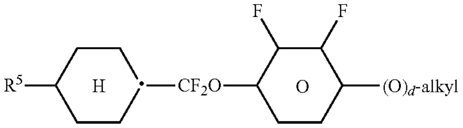

Y2

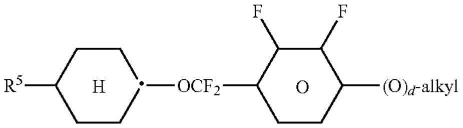

Y3

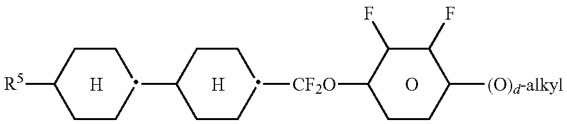

Y4

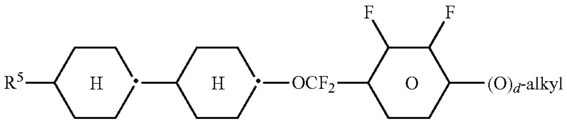

Y5

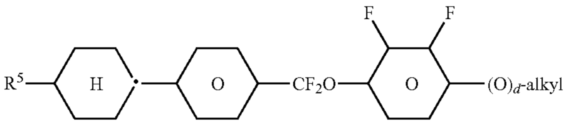

Y6

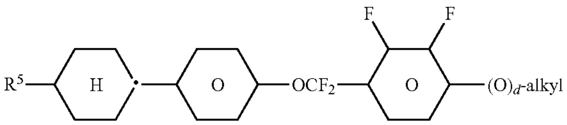

Y7

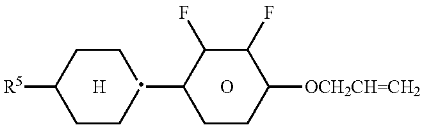

Y8

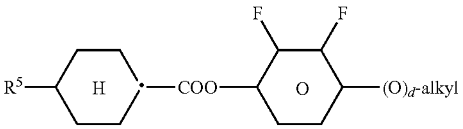

Y9

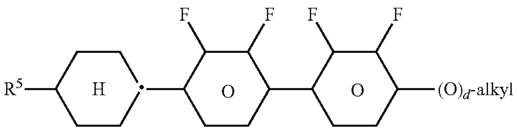

Y10

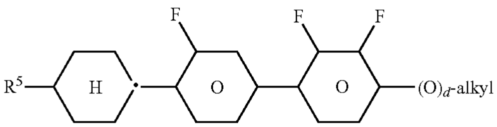

-continued

Y11

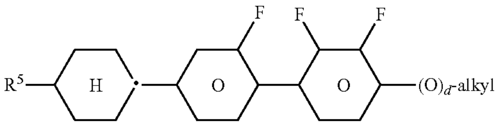

Y12

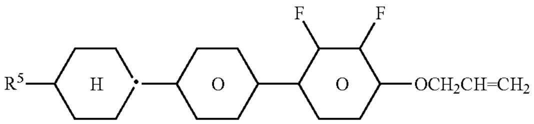

Y13

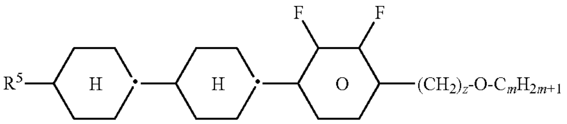

Y14

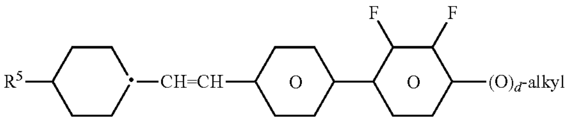

Y15

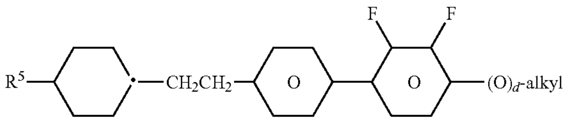

Y16

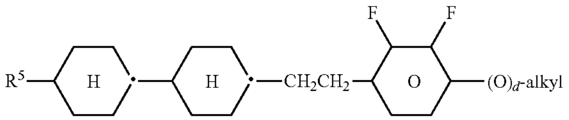

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

B1

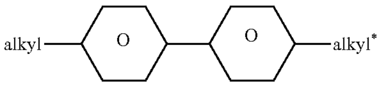

B2

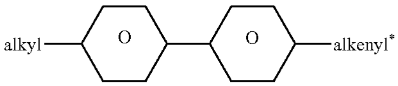

B3

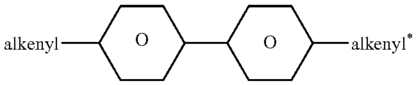

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

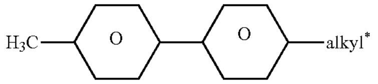

B2a

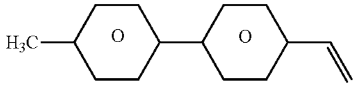

B2b

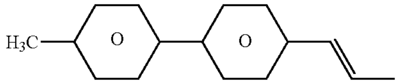

B2c

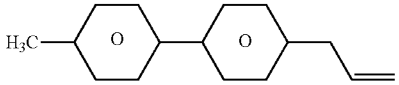

B2d

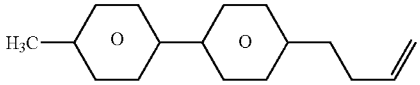

B2e

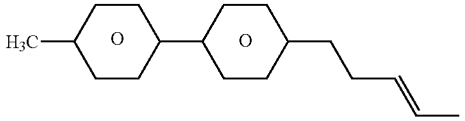

in which alkyl* denotes an alkyl radical having 1-6 C atoms. The medium according to the invention particularly preferably comprises one or more compounds of the formulae B1a and/or B2e.

h) LC medium which additionally comprises one or more terphenyl compounds of the following formula:

T

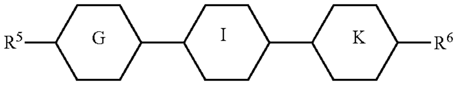

in which $R^5$ and $R^6$ each, independently of one another, have one of the meanings indicated above, and

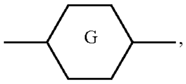, 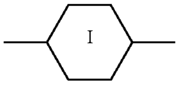 and

-continued

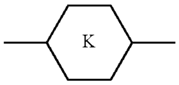

each, independently of one another, denote

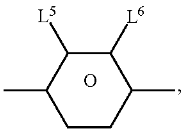, 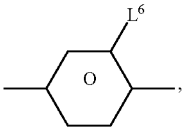,

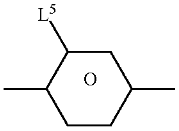 or 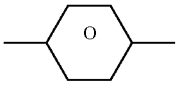

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T1

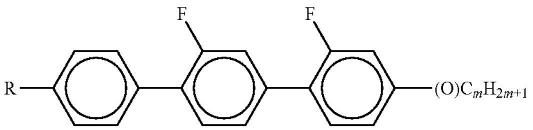

T2

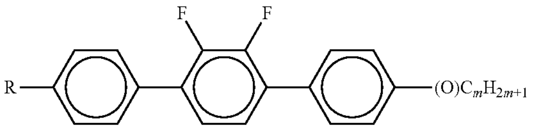

T3

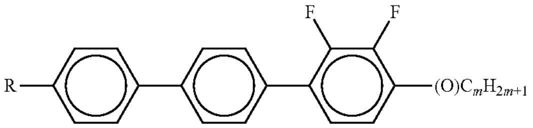

T4

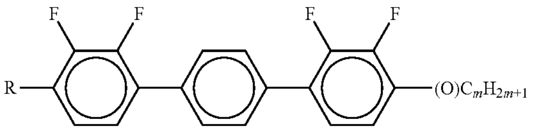

T5

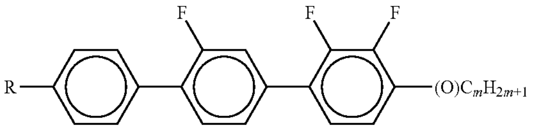

T6

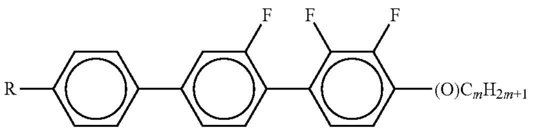

-continued
T7
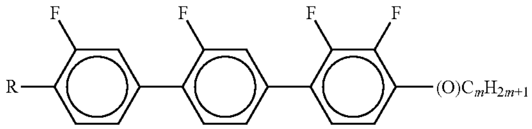
T8
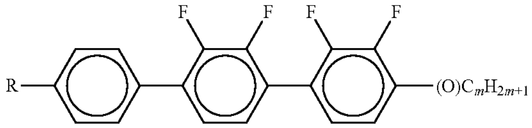
T9
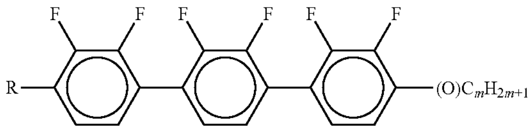
T10
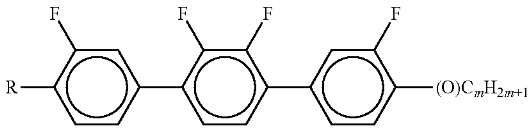
T11
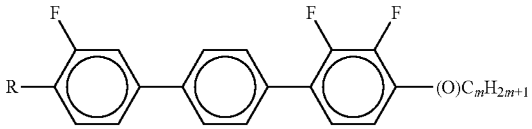
T12
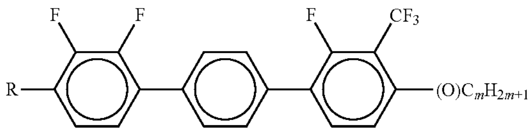
T13
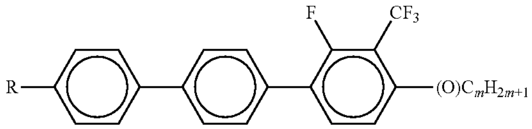
T14
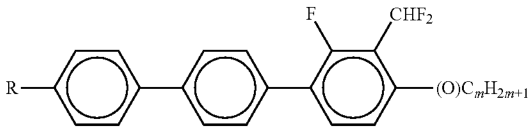
T15
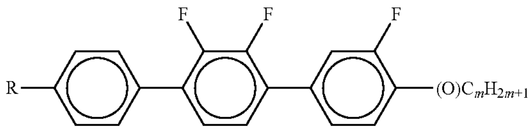
T16
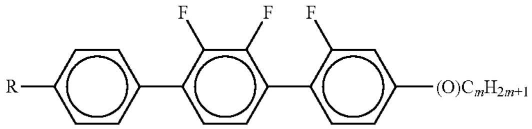
-continued
T17
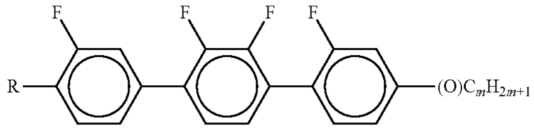
T18
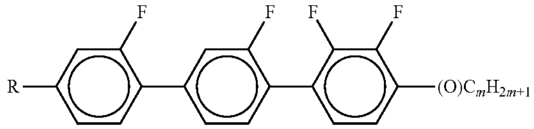
T19
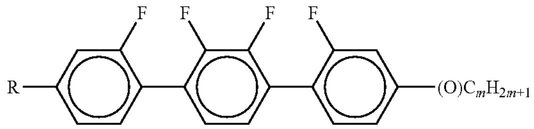
T20
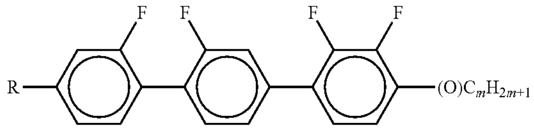
T21
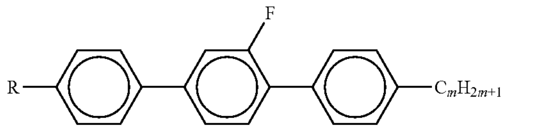
T22
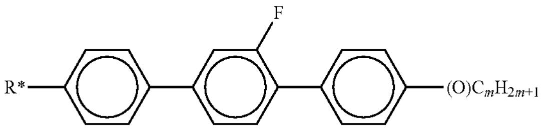
T23
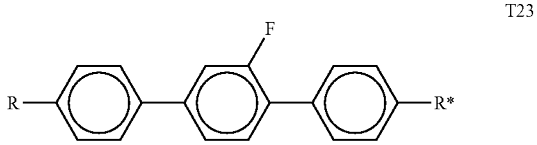
T24
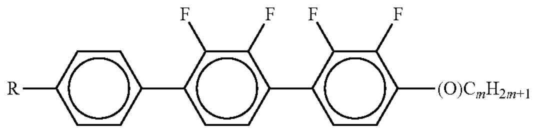
T25
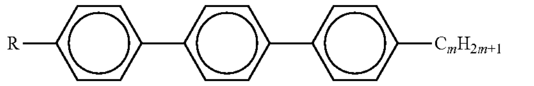
T26
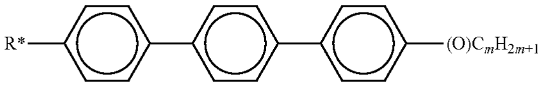
T27
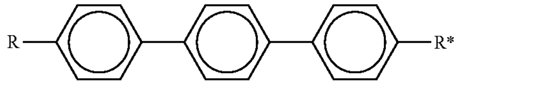

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

O1

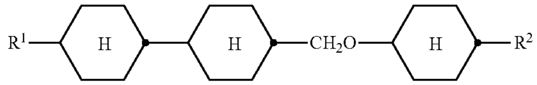

O2

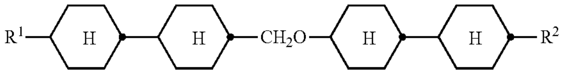

O3

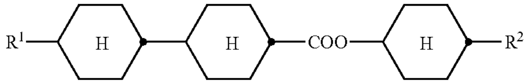

O4

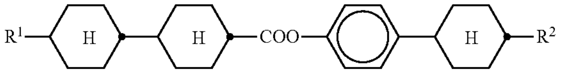

O5

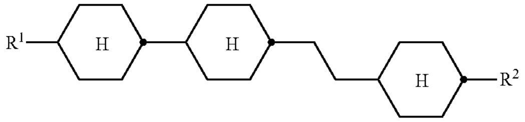

O6

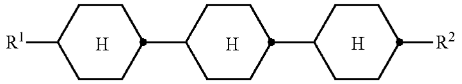

O7

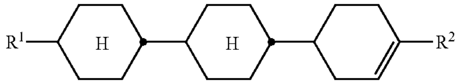

O8

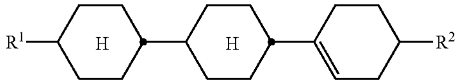

-continued

O9

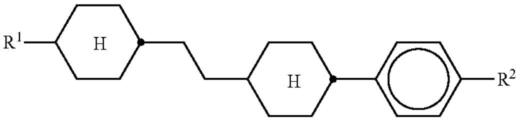

O10

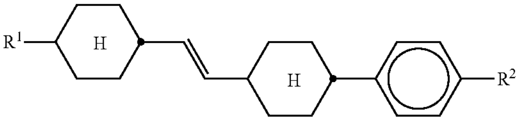

O11

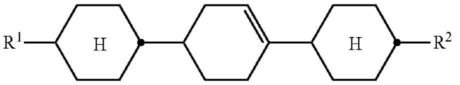

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

k) LC medium which additionally comprises one or more compounds of the following formula:

FI

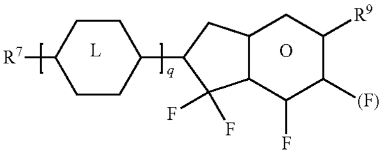

in which

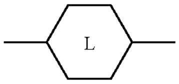

denotes

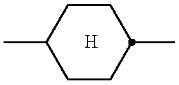 , 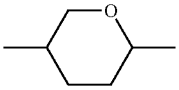 ,

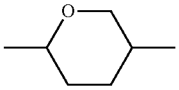 , 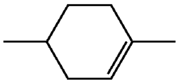

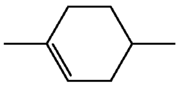 , 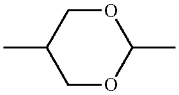 ,

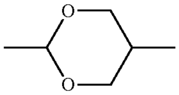 , 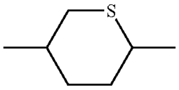

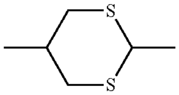 , 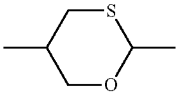 , $R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

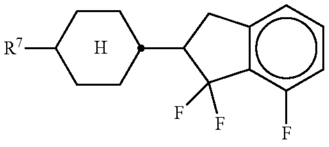

FI2

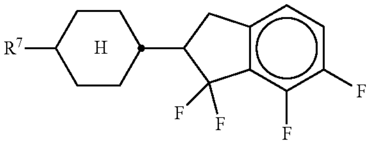

FI3

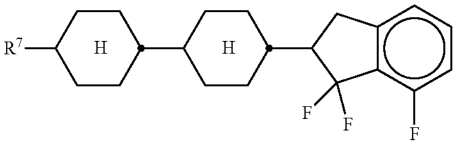

FI4

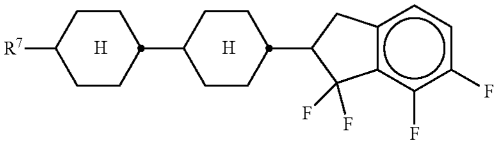

FI5

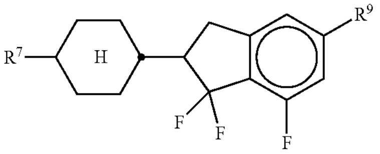

FI6

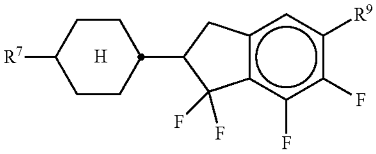

FI7

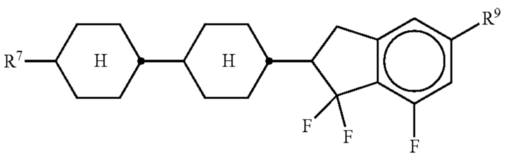

FI8

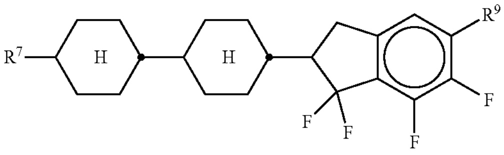

in which $R^7$ preferably denotes straight-chain alkyl, and $R^9$ denotes $CH_3$, $C_2H_5$ or n-$C_3H_7$. Preference is given to the compounds of the formulae FI1, FI2 and FI3.

l) LC medium which additionally comprises one or more compounds selected from the group consisting of the following formulae:

VK1

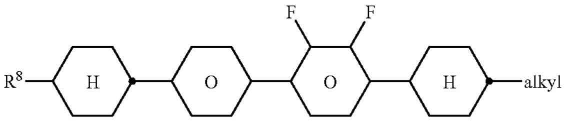

VK2

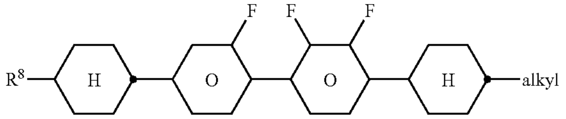

VK3

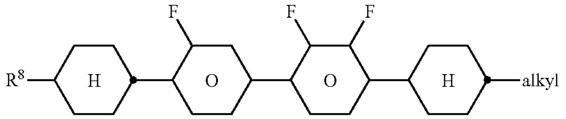

VK4

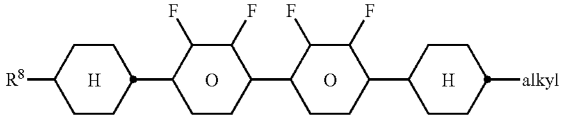

in which $R^8$ has the meaning indicated for $R^1$, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

N1

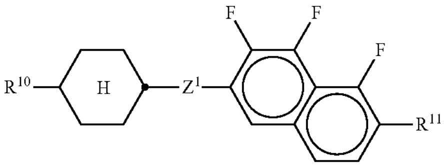

N2

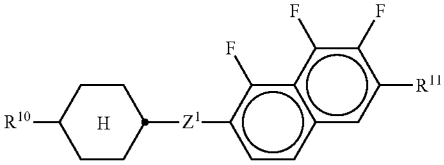

N3

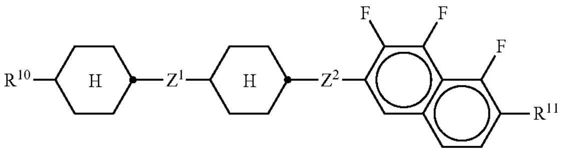

-continued

N4

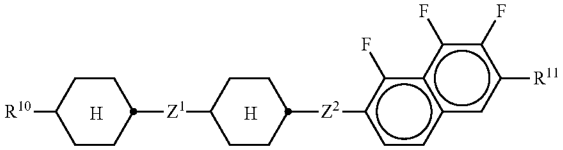

N5

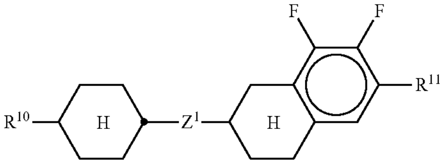

N6

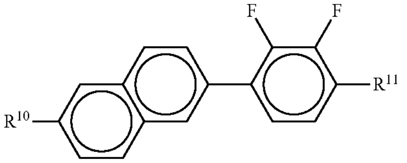

N7

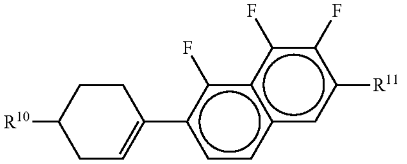

N8

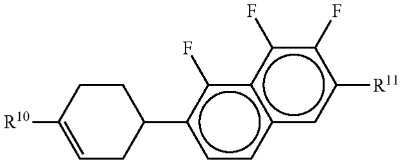

N9

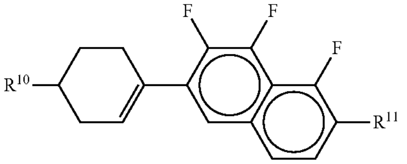

N10

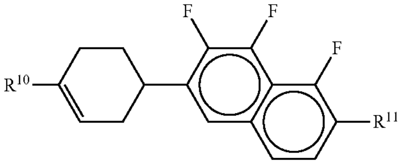

in which $R^{10}$ and $R^{11}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH═CH—, —$(CH_2)_4$—, —$(CH_2)_{30}$—, —$O(CH_2)_3$—, —CH═$CHCH_2CH_2$—, —$CH_2CH_2$CH═CH—, —$CH_2O$—, —$OCH_2$—, —CO—O—, —O—CO—, —$C_2F_4$—, —CF═CF—, —CF═CH—, —CH═CF—, —$CH_2$— or a single bond.

n) LC medium which additionally comprises one or more difluoro-dibenzochromans and/or chromans of the following formulae:

BC

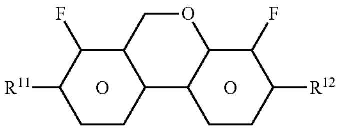

CR

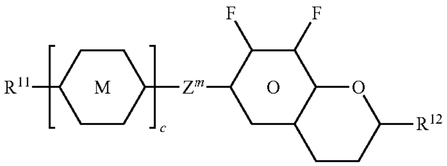

RC

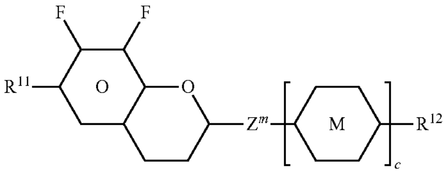

in which $R^{11}$ and $R^{12}$ each, independently of one another, have one of the meanings indicated above for $R^{11}$ under formula N1 ring M is trans-1,4-cyclohexylene or 1,4-phenylene, $Z^m$ —$C_2H_4$—, —$CH_2O$—, —$OCH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

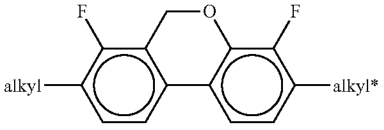

BC2

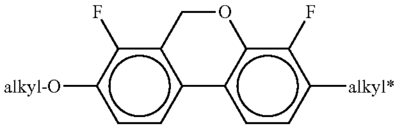

BC3

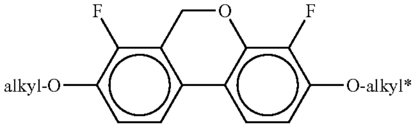

BC4

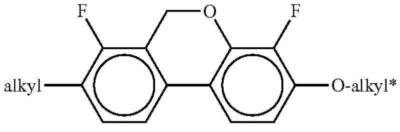

-continued

BC5

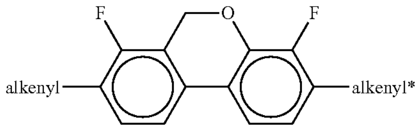

BC6

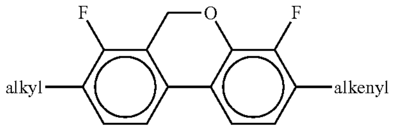

BC7

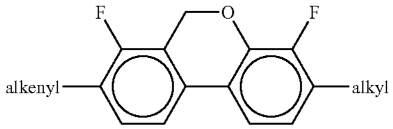

CR1

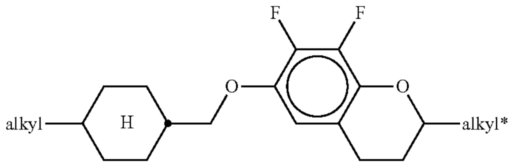

CR2

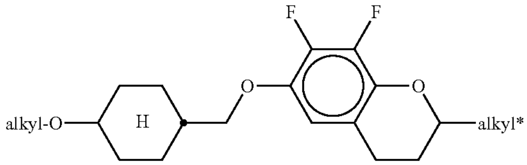

CR3

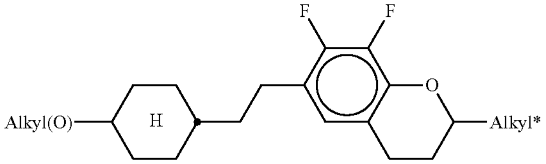

CR4

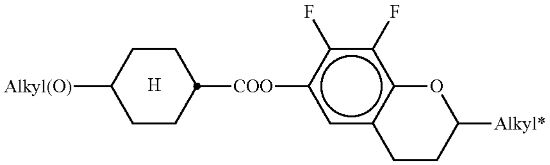

CR5

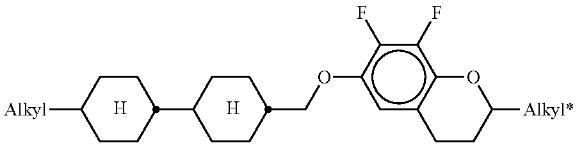

CR6

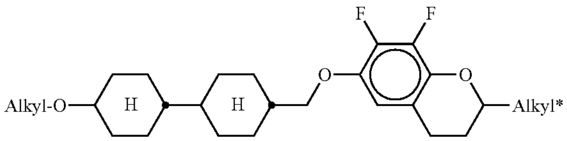

-continued

CR7

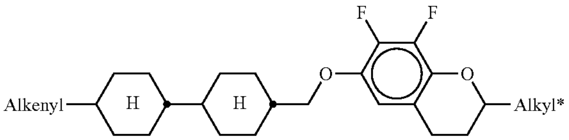

CR8

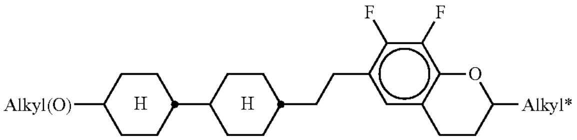

CR9

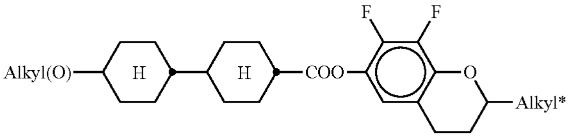

RC1

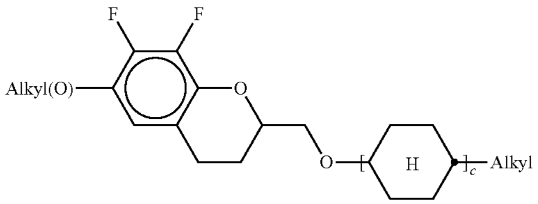

RC2

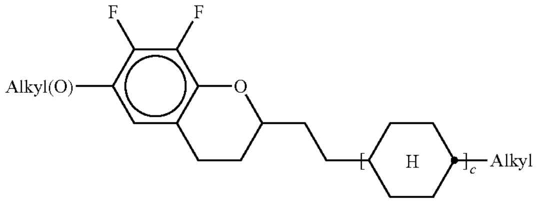

RC3

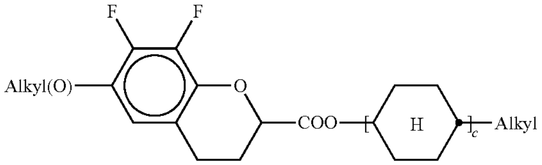

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very particular preference is given to mixtures comprising one, two or three compounds of the formula BC-2.

o) LC medium which additionally comprises one or more fluorinated phenanthrenes and/or dibenzofurans of the following formulae:

PH

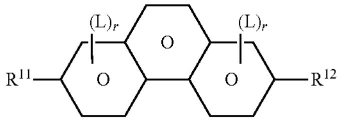

BF

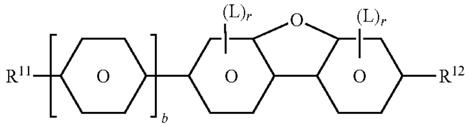

BS

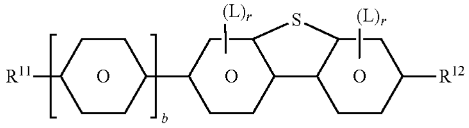

in which $R^{11}$ and $R^{12}$ each, independently of one another, have one of the meanings indicated above for $R^{11}$ under formula N1, b denotes 0 or 1, L denotes F, and r denotes 1, 2 or 3.

Particularly preferred compounds of the formulae PH and BF are selected from the group consisting of the following sub-formulae:

PH1

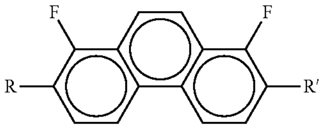

PH2

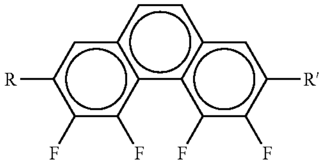

BF1

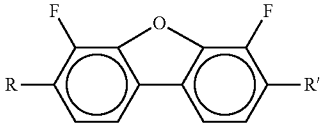

BF2

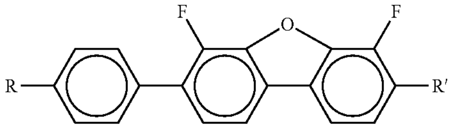

BS1

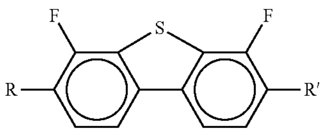

BS2

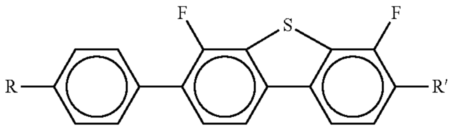

in which R and R' each, independently of one another, denote a straight-chain alkyl or alkoxy radical having 1-7 C atoms.

p) LC medium which additionally comprises one or more monocyclic compounds of the following formula

Y

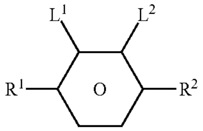

wherein $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

Y1

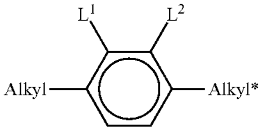

Y2

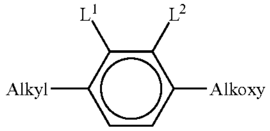

Y3

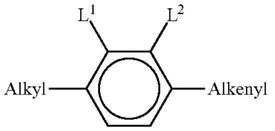

Y4

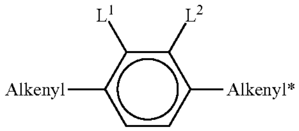

Y5

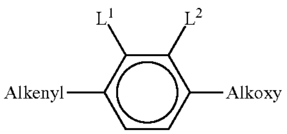

Y6

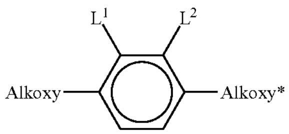

-continued

Y7

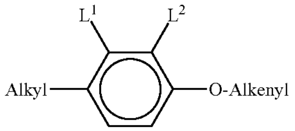

Y8

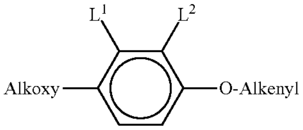

Y9

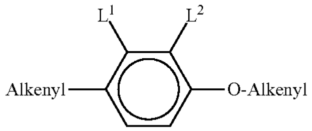

Y10

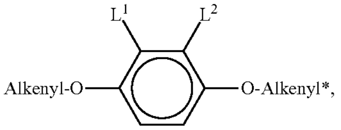

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the formula Y are selected from the group consisting of the following sub-formulae:

Y6A

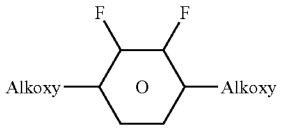

Y6B

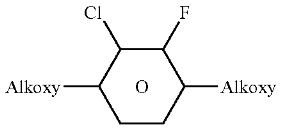

wherein Alkoxy preferably denotes straight-chain alkoxy with 3, 4, or 5 C atoms.

q) LC medium which, apart from the stabilisers according to the invention, in particular of the formula I or sub-formulae thereof and the comonomers, comprises no compounds which contain a terminal vinyloxy group ($—O—CH{=}CH_2$).

r) LC medium which comprises 1 to 5, preferably 1, 2 or 3, stabilisers, preferably selected from stabilisers according to the invention, in particular of the formula I or sub-formulae thereof.

s) LC medium in which the proportion of stabilisers, in particular of the formula I or sub-formulae thereof, in the mixture as a whole is 1 to 1500 ppm, preferably 100 to 1000 ppm.

t) LC medium which comprises 1 to 8, preferably 1 to 5, compounds of the formulae CY1, CY2, PY1 and/or PY2. The proportion of these compounds in the mixture as a whole, is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole, is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

In another preferred embodiment of the present invention the LC medium contains one or more nematogenic compounds with positive dielectric anisotropy. Preferred embodiments of such an LC medium are those of sections aa)-mmm) below:

aa) LC-medium, characterised in that it comprises one or more compounds selected from the group of compounds of the formulae II and III

II

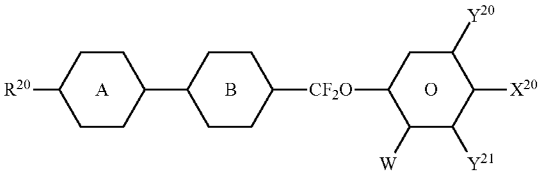

III

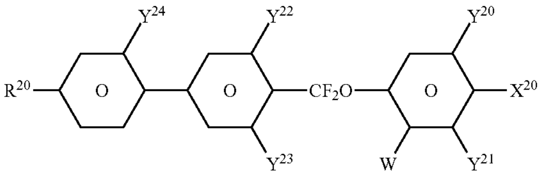

wherein $R^{20}$ each, identically or differently, denote a halogenated or unsubstituted alkyl or alkoxy radical having 1 to 15 C atoms, where, in addition, one or more $CH_2$ groups in these radicals may each be replaced, independently of one another, by —C≡C—, —$CF_2O$—, —CH═CH—,

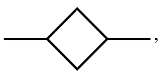, 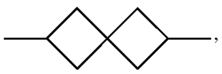,

—O—, —O—, —CO—O— or —O—CO— in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{20-24}$ each, identically or differently, denote H or F;

W denotes H or methyl,

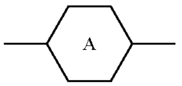 and 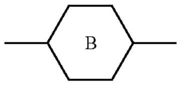

each, independently of one another, denote

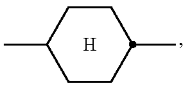, 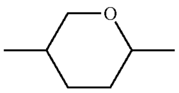 or

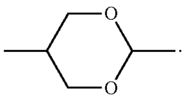.

The compounds of the formula II are preferably selected from the following formulae:

IIa

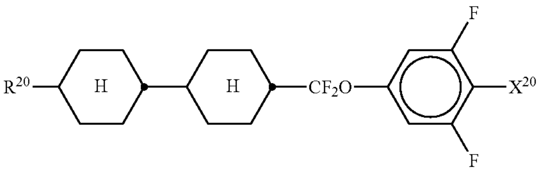

IIb

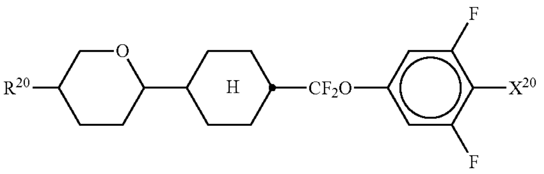

IIc

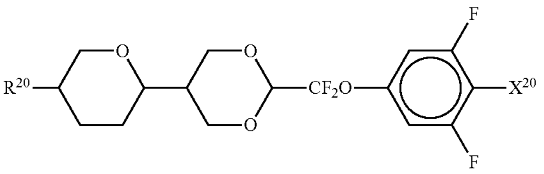

IId

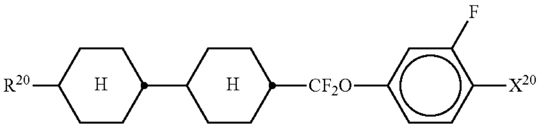

IIe

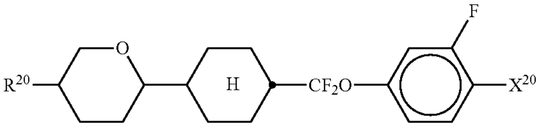

IIf

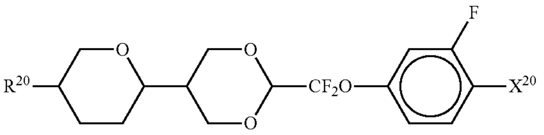

wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIa and IIb, in particular compounds of the formulae IIa and IIb wherein X denotes F.

The compounds of the formula III are preferably selected from the following formulae:

IIIa

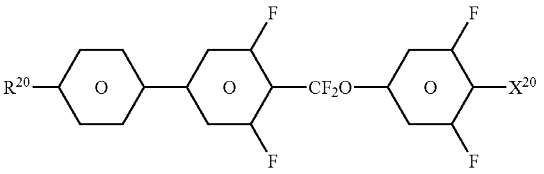

-continued

IIIb

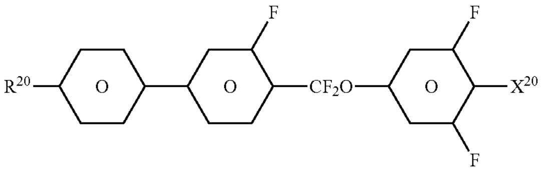

IIIc

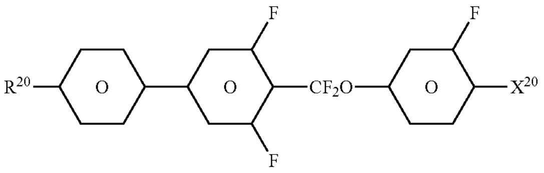

IIId

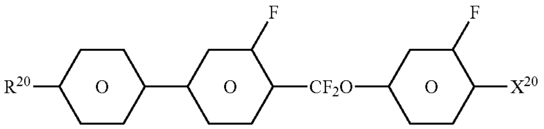

IIIe

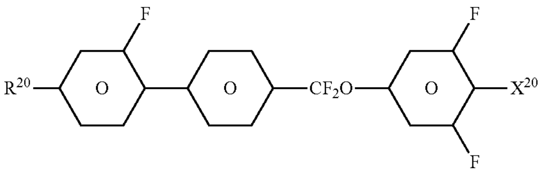

wherein $R^{20}$ and $X^{20}$ have the meanings indicated above.

$R^{20}$ preferably denotes alkyl having 1 to 6 C atoms. $X^{20}$ preferably denotes F. Particular preference is given to compounds of the formulae IIIa and IIIe, in particular compounds of the formula IIIa;

bb) LC-medium additionally comprising one or more compounds selected from the following formulae:

IV

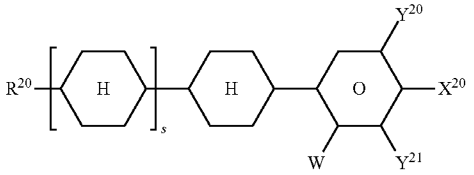

V

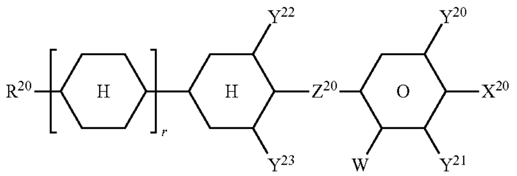

VI

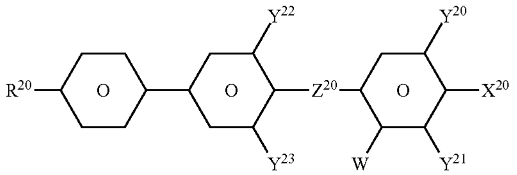

-continued

VII

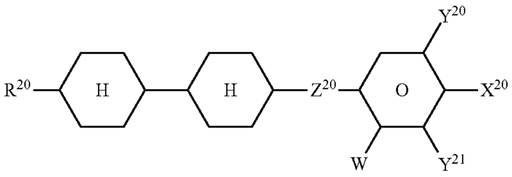

VIII

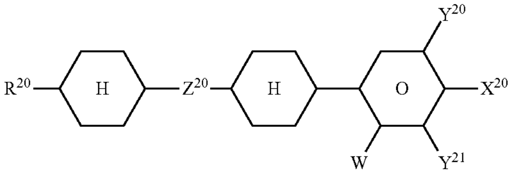

wherein $R^{20}$, $X^{20}$, W and $Y^{20-23}$ have the meanings indicated above under formula II, and $Z^{20}$ denotes $—C_2H_4—$, $—(CH_2)_4—$, $—CH{=}CH—$, $—CF{=}CF$, $—C_2F_4—$, $—CH_2CF_2—$, $—CF_2CH_2—$, $—CH_2O—$, $—OCH_2—$, $—COO—$ or $—OCF_2—$, in formulae V and VI also a single bond, in formulae V and VIII also $—CF_2O—$, r denotes 0 or 1, and s denotes 0 or 1;

The compounds of the formula IV are preferably selected from the following formulae:

IVa

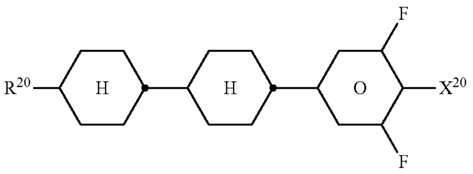

IVb

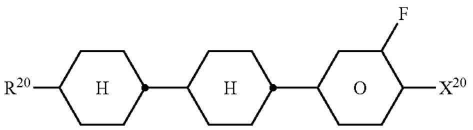

IVc

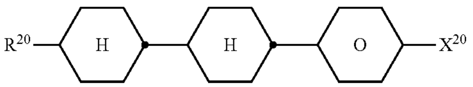

IVd

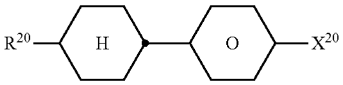

wherein $R^{20}$ and $X^{20}$ have the meanings indicated above.

$R^{20}$ preferably denotes alkyl having 1 to 6 C atoms. $X^{20}$ preferably denotes F or $OCF_3$, furthermore $OCF{=}CF_2$ or $C_1$;

The compounds of the formula V are preferably selected from the following formulae:

Va

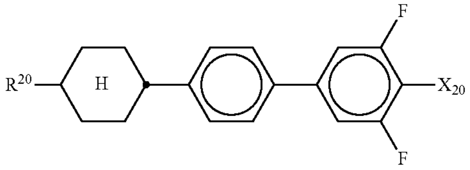

Vb

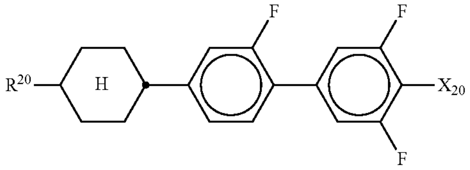

Vc

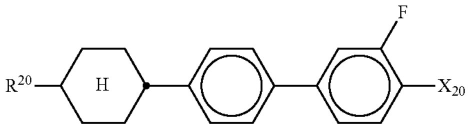

Vd

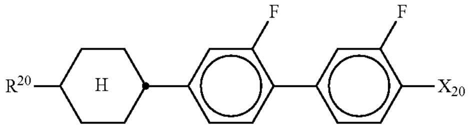

Ve

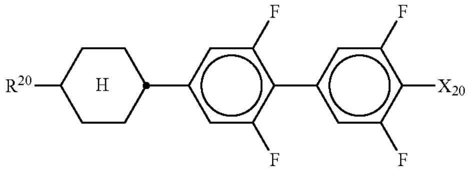

Vf

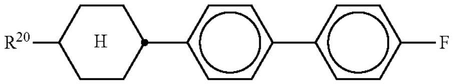

Vg

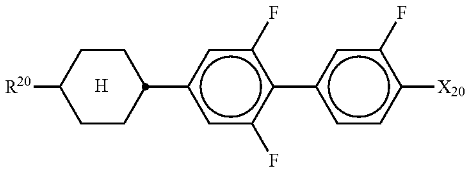

Vh

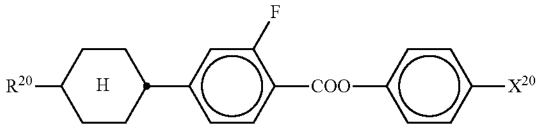

wherein $R^{20}$ and $X^{20}$ have the meanings indicated above.

$R^{20}$ preferably denotes alkyl having 1 to 6 C atoms. $X^{20}$ preferably denotes F and $OCF_3$, furthermore $OCHF_2$, $CF_3$, $OCF{=}CF_2$ and $OCH{=}CF_2$;

The compounds of the formula VI are preferably selected from the following formulae:

VIa

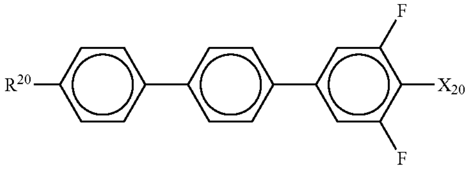

VIb

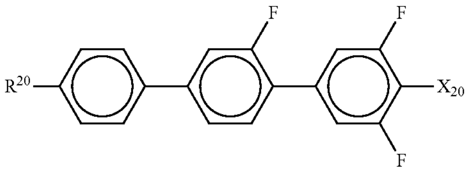

VIc

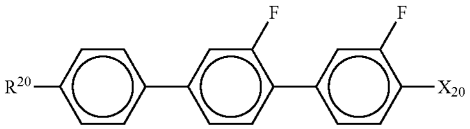

VId

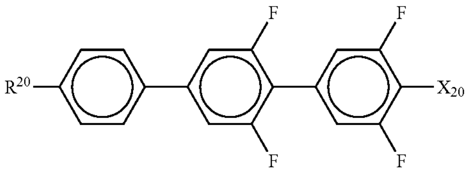

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $CF_3$, $CF{=}CF_2$, $OCHF_2$ and $OCH{=}CF_2$;

The compounds of the formula VII are preferably selected from the following formulae:

VIIa

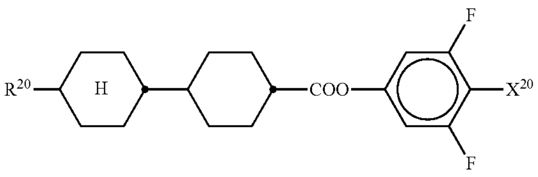

VIIb

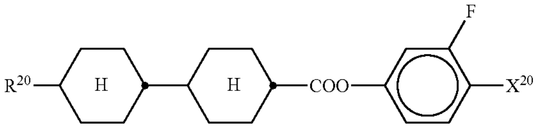

wherein $R^{20}$ and $X^{20}$ have the meanings indicated above.

$R^{20}$ preferably denotes alkyl having 1 to 6 C atoms. $X^{20}$ preferably denotes F, furthermore $OCF_3$, $OCHF_2$ and $OCH{=}CF_2$.

cc) The medium additionally comprises one or more compounds selected from the formulae ZK1 to ZK10 given above. Especially preferred are compounds of formula ZK1 and ZK3. Particularly preferred compounds of formula ZK are selected from the sub-formulae ZK1a, ZK1b, ZK1c, ZK3a, ZK3b, ZK3c and ZK3d.

dd) The medium additionally comprises one or more compounds selected from the formulae DK1 to DK12 given above. Especially preferred compounds are DK3.

ee) The medium additionally comprises one or more compounds selected from the following formulae:

IX

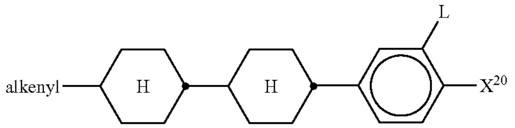

wherein $X^{20}$ has the meanings indicated above, and

L denotes H or F,

"alkenyl" denotes $C_{2-6}$-alkenyl.

ff) The compounds of the formulae DK-3a and IX are preferably selected from the following formulae:

DK3a

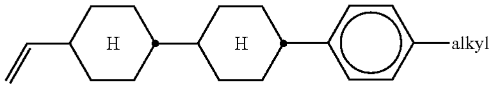

IXa

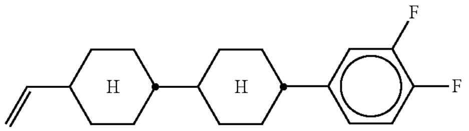

wherein "alkyl" denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

X

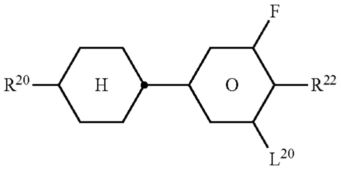

wherein $L^{20}$ denotes H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

XI

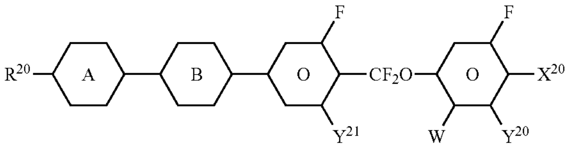

XII

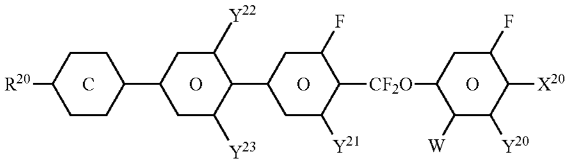

Wherein W, $R^{20}$, $X^{20}$ and $Y^{20-23}$ have the meanings indicated in formula III, and

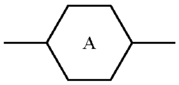 and 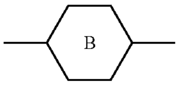

each, independently of one another, denote

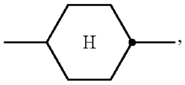, 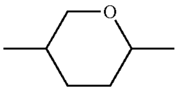 or

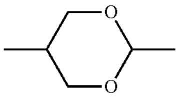

and

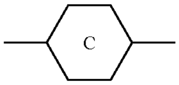

denotes

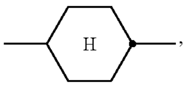, 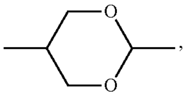,

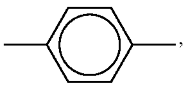, 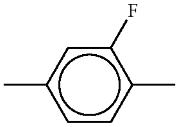 or

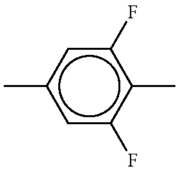

The compounds of the formulae XI and XII are preferably selected from the following formulae:

XIa

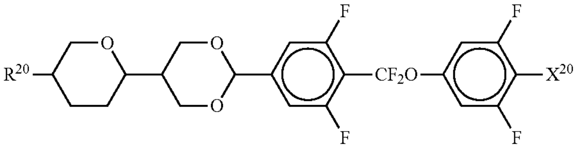

XIb

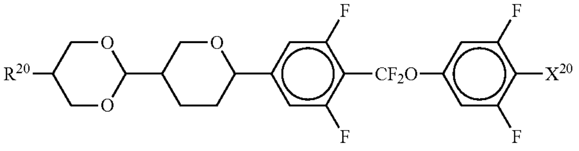

XIc

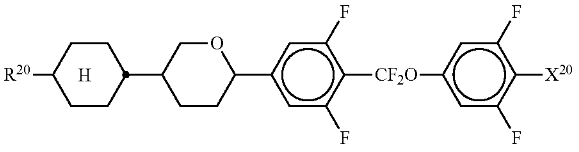

XId

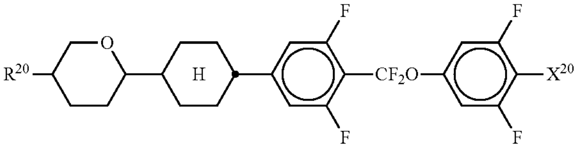

XIe

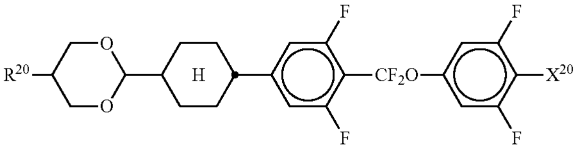

XIf

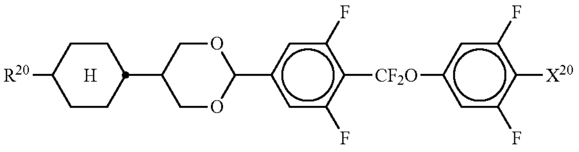

XIIa

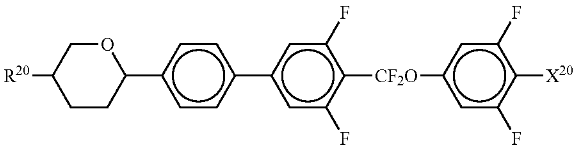

XIIb

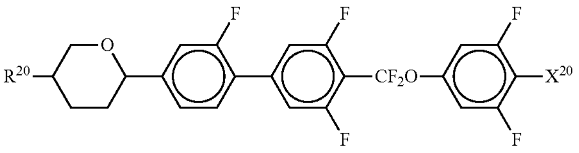

-continued

XIIc

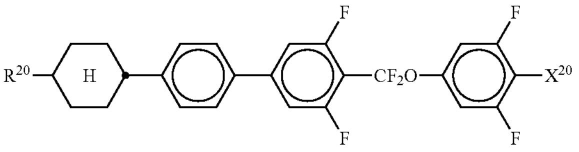

XIId

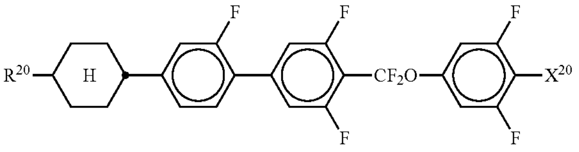

XIIe

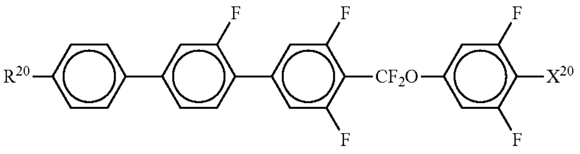

XIIf

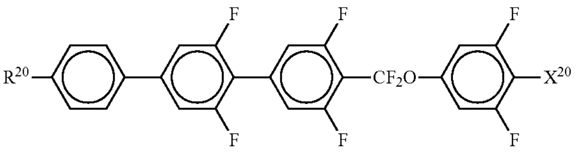

XIIg

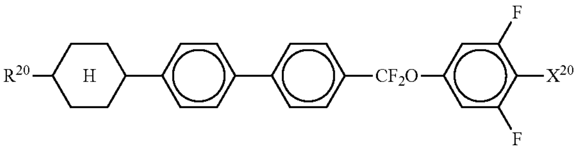

wherein $R^{20}$ and $X^{20}$ have the meaning indicated above and preferably $R^{20}$ denotes alkyl having 1 to 6 C atoms and $X^{20}$ denotes F. The mixture according to the invention particularly preferably comprises at least one compound of the formula XIIa and/or XIIe.

jj) The medium comprises one or more compounds of formula T given above, preferably selected from the group of compounds of the formulae T21 to T23 and T25 to T27.

Preference is given to the compounds of the formulae T21 to T23. Very particular preference is given to the compounds of the formulae

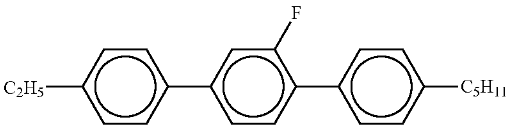

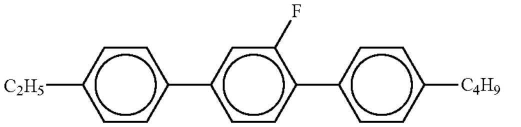

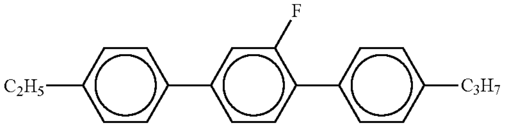

-continued

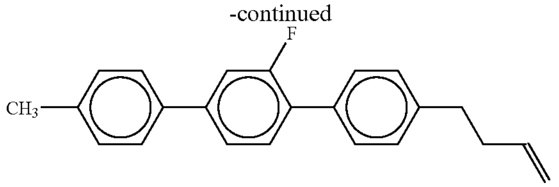

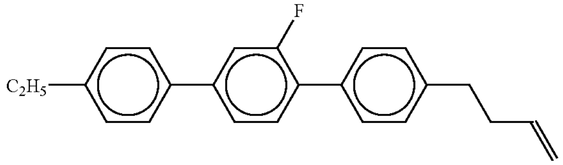

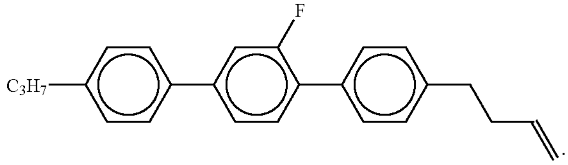

kk) The medium comprises one or more compounds selected from the group of formulae DK9, DK10 and DK11 given above.

ll) The medium additionally comprises one or more compounds selected from the following formulae:

XIII

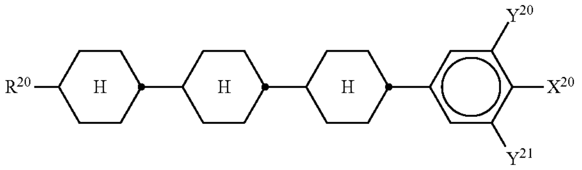

XIV

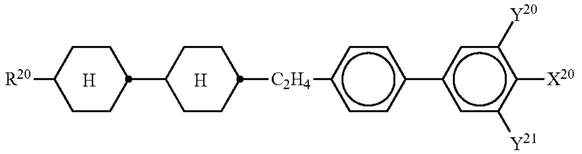

XV

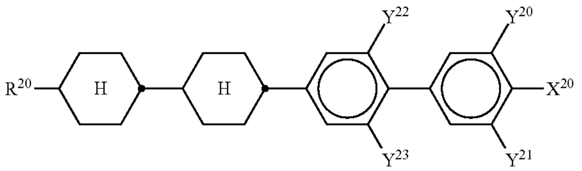

XVI

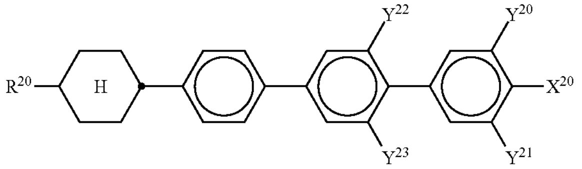

XVII

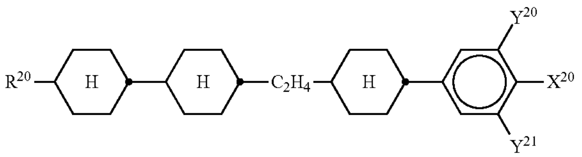

-continued

XVIII

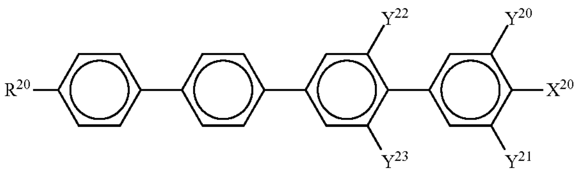

wherein $R^{20}$ and $X^{20}$ each, independently of one another, have one of the meanings indicated above, and $Y^{20-23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a, XVIII-a

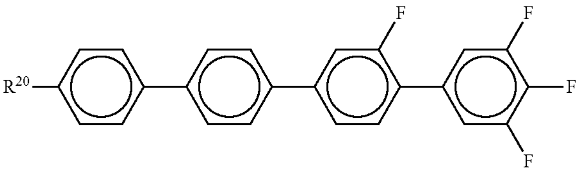

wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

XIX

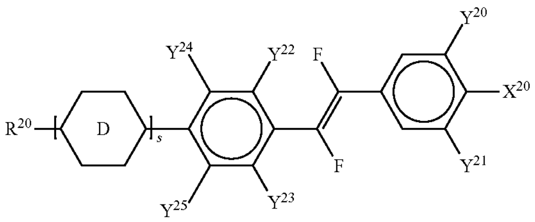

wherein $R^{20}$, $X^{20}$ and $Y^{20-25}$ have the meanings indicated in formula I, s denotes 0 or 1, and

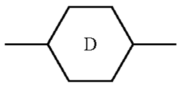

denotes

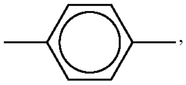
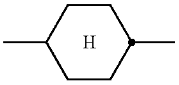
or
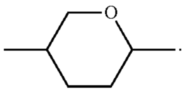

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:

XIXa

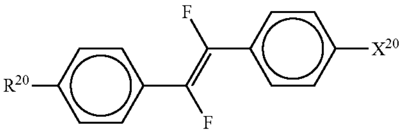

XIXb

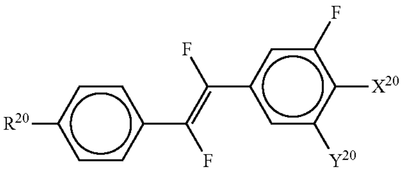

XIXc

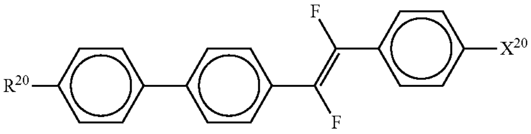

XIXd

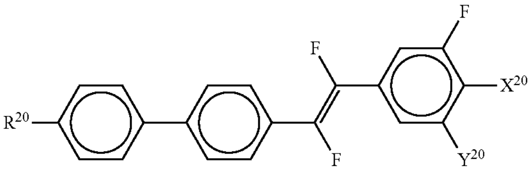

XIXe

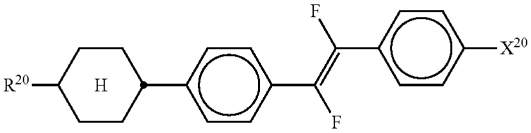

XIXf

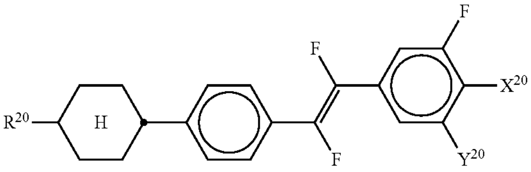

-continued

XIXg

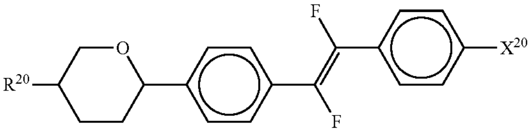

XIXh

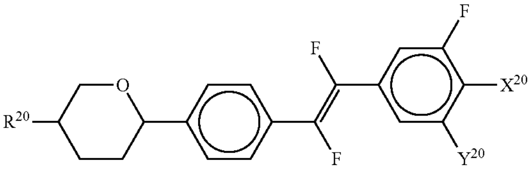

wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;

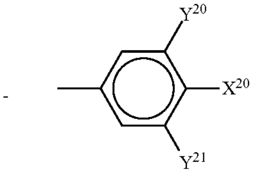

is preferably

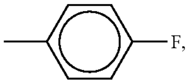

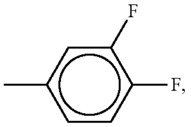
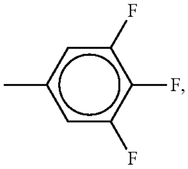

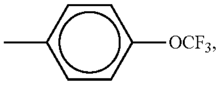
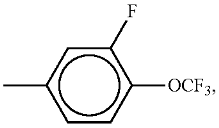

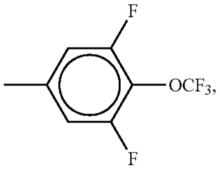
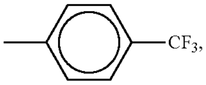

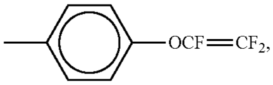

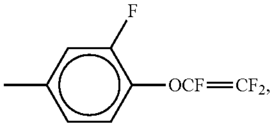

-continued

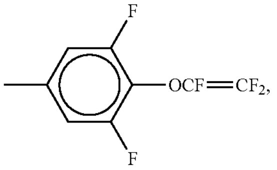,

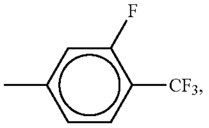,

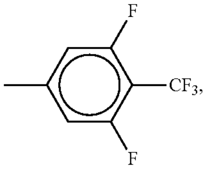,

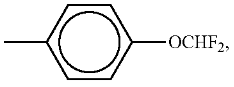,

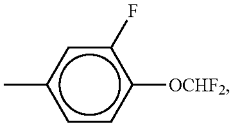,

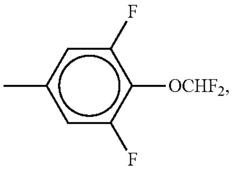,

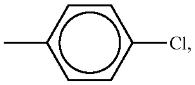,

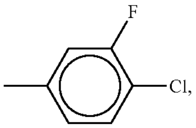, or

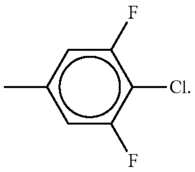.

$R^{20}$ is straight-chain alkyl or alkenyl having 2 to 6 C atoms;

nn) The medium comprises one or more compounds of the formulae G1 to G4 given above, preferably selected from G1 and G2 wherein alkyl denotes $C_{1-6}$-alkyl, $L^x$ denotes H and X denotes F or Cl. In G2, X particularly preferably denotes Cl.

oo) The medium comprises one or more compounds of the following formulae:

XX

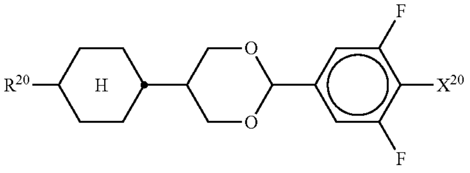

XXI

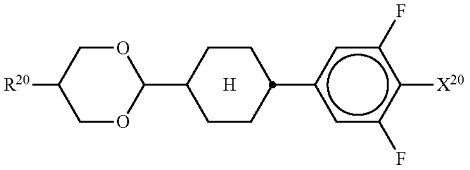

-continued

XXII

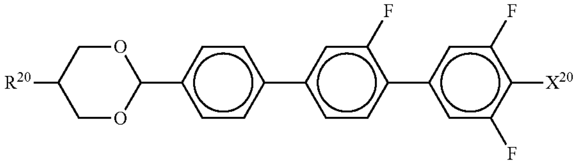

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula XXII wherein $X^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise at least one compound of the formula XXII.

pp) The medium comprises one or more compounds of the following pyrimidine or pyridine compounds of the formulae

M-1

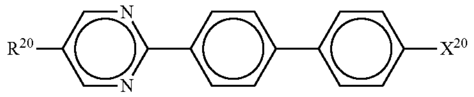

M-2

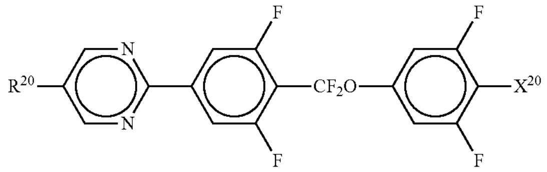

M-3

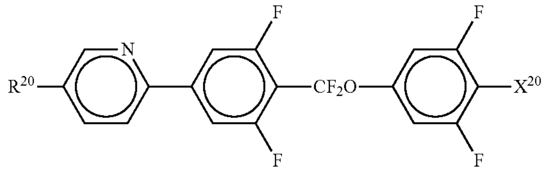

wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula M-1, wherein $X^{20}$ preferably denotes F. The compound(s) of the formulae M-1-M-3 is (are) preferably employed in the mixtures according to the invention in amounts of 1-20% by weight, particularly preferably 1-15% by weight.

Further preferred embodiments are indicated below:

qq) The medium comprises two or more compounds of the formula XII, in particular of the formula XIIe;

rr) The medium comprises 2-30% by weight, preferably 3-20% by weight, particularly preferably 3-15% by weight, of compounds of the formula XII;

ss) Besides the compounds of the formulae XII, the medium comprises further compounds selected from the group of the compounds of the formulae II, III, IX-XIII, XVII and XVIII;

tt) The proportion of compounds of the formulae II, III, IX-XI, XIII, XVII and XVIII in the mixture as a whole is 40 to 95% by weight;

uu) The medium comprises 10-50% by weight, particularly preferably 12-40% by weight, of compounds of the formulae II and/or III;

vv) The medium comprises 20-70% by weight, particularly preferably 25-65% by weight, of compounds of the formulae IX-XIII;

ww) The medium comprises 4-30% by weight, particularly preferably 5-20% by weight, of compounds of the formula XVII;

xx) The medium comprises 1-20% by weight, particularly preferably 2-15% by weight, of compounds of the formula XVIII;

yy) The medium comprises at least two compounds of the formulae

XIIe-1

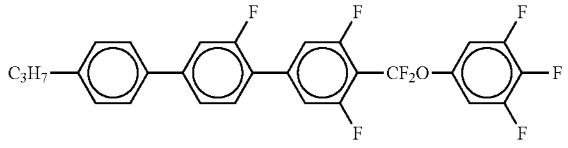

XIIe-2

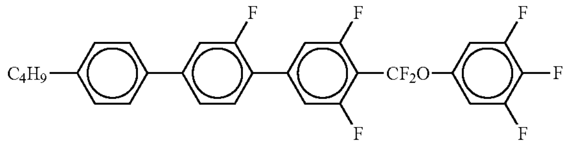

XIIe-3

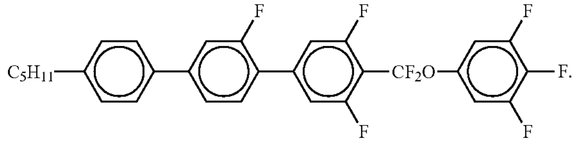

zz) The medium comprises at least two compounds of the formulae

XIIa-1

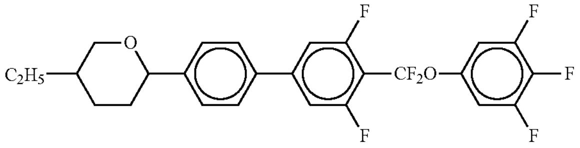

XIIa-2

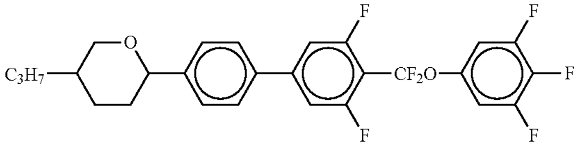

-continued

XIIa-3

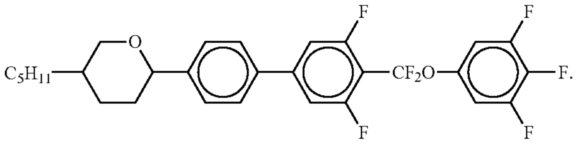

aaa) The medium comprises at least two compounds of the formula XIIa and at least two compounds of the formula XIIe.

bbb) The medium comprises at least one compound of the formula XIIa and at least one compound of the formula XIIe and at least one compound of the formula IIIa.

ccc) The medium comprises at least two compounds of the formula XIIa and at least two compounds of the formula XIIe and at least one compound of the formula IIIa.

ddd) The medium comprises in total 25% by weight, preferably 30% by weight, of one or more compounds of the formula XII.

eee) The medium comprises 20% by weight, preferably 24% by weight, preferably 25-60% by weight, of compounds of the formula ZK3, in particular the compound of the formula ZK3a, ZK3a

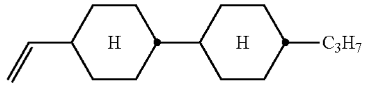

fff) The medium comprises at least one compound selected from the group of compounds ZK3a, ZK3b and ZK3c, preferably ZK3a, in combination with compound ZK3d ZK3d

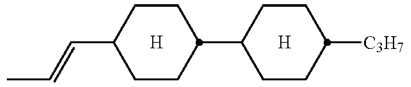

ggg) The medium comprises at least one compound of the formula DPGU-n-F.

hhh) The medium comprises at least one compound of the formula CDUQU-n-F.

iii) The medium comprises at least one compound of the formula CPU-n-OXF.

jjj) The medium comprises at least one compound of the formula CPGU-3-OT.

kkk) The medium comprises at least one compound of the formula PPGU-n-F.

lll) The medium comprises at least one compound of the formula PGP-n-m, preferably two or three compounds.

mmm) The medium comprises at least one compound of the formula PGP-2-2V having the structure

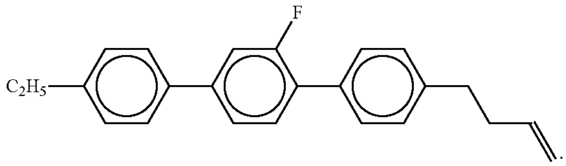

In a preferred embodiment, the liquid crystal mixture according to the present invention further comprises one or more polymerizable compounds.

The polymerizable compounds can be selected from isotropic or mesogenic polymerizable compounds known to the skilled person in the art.

Preferably, the liquid crystal mixture according to the present invention further comprises one or more polymerizable compounds of formula P, $P^a$-$Sp^a$-$(A^P)$—$P^b$ P wherein the individual radicals have the following meanings:

$P^a$ and $P^b$ denotes each and independently a polymerizable group, preferably selected from the group consisting of acrylate, methacrylate, ethacrylate, fluoroacrylate, vinyloxy, chloroacrylate, oxetane, or epoxide groups $Sp^a$ denotes a spacer group or a single bond, $A^P$ is a group selected from the following formulae Ar1

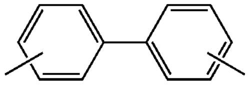

Ar2

Ar3

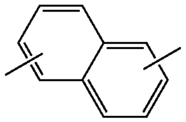

Ar4

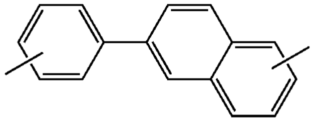

Ar5

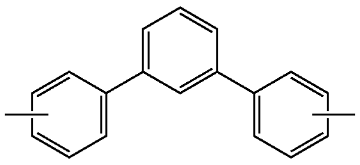

Ar6

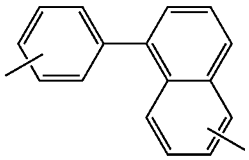

-continued

Ar7

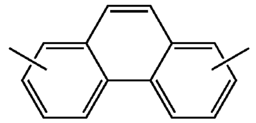

which is optionally substituted by one or more groups $L^a$, $L^a$ is on each occurrence identically or differently F, Cl, —CN, P-Sp-, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that 0- and/or S-atoms are not directly connected with each other, and wherein one or more H atoms are each optionally replaced by F or Cl, and Preferred spacer groups $Sp^a$ are selected from the formula Sp"-X", so that the radicals P-Sp- and $P^{a/b}$-$Sp^{a/b}$- conforms to the formulae P-Sp"-X"— and $P^{a/b}$-Sp"-X"—, respectively, wherein Sp" denotes alkylene having 1 to 20, preferably 1 to 12, C atoms, which is optionally mono- or polysubstituted by F, Cl, Br, I or CN and wherein, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH═CH— or —C≡C— in such a way that O and/or S atoms are not linked directly to one another, or a single bond, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^3$═$CY^4$—, —C≡C—, —CH═CH—CO—O—, —O—CO—CH═CH— or a single bond, preferably a single bond $R^0$, $R^{00}$ and $R^{000}$ each, independently of one another, denote H or alkyl having 1 to 12 C atoms, and $Y^3$ and $Y^4$ each, identically or differently, denote H, F, Cl or CN.

X" is preferably —O—, —S—, —CO—, —C(O)O—, —OC(O)—, —O—C(O)O—, —CO—$NR^0$—, —$NR^0$—CO—, —$NR^0$—CO—$NR^0$— or a single bond.

Typical spacer groups Sp" are, for example, a single bond, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —($SiR^{00}R^{000}$—O$)_{p1}$—, wherein p1 is an integer from 1 to 12, q1 is an integer from 1 to 3, and $R^{00}$ and $R^{000}$ have the meanings indicated above.

Particularly preferred groups -Sp"-X"— are a single bond, —$(CH_2)_{p1}$—, —$(CH_2)_{p1}$—O—, —$(CH_2)_{p1}$—O—CO—, —$(CH_2)_{p1}$—O—CO—O—, wherein p1 and q1 have the meanings indicated above.

Particularly preferred groups Sp" are, for example, in each case straight-chain methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The compounds of formula P and subformulae thereof used in the present invention are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The amount of one, two, three or more polymerizable compounds of formula P in the LC mixture as a whole is preferably ranging from 0.1 to 5%, more preferably ranging from 0.3 to 3%, especially ranging from 0.5 to 2%.

The polymerizable compounds of formulae I and P are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

LC medium as a whole may also comprise one or more stabilisers in order to prevent undesired spontaneous polymerisation of the polymerizable compounds, for example during storage or transport. Suitable types and amounts of stabilisers are known to the person skilled in the art and are described in the literature. Particularly suitable are, for example, the commercially available stabilisers from the Irganox® series (BASF SE), such as, for example, Irganox® 1076. If stabilisers are employed, their proportion, based on the total amount of the polymerizable compounds as a whole, is preferably 10-10,000 ppm, particularly preferably 50-1000 ppm.

The media are prepared in a manner conventional per se. In general, the components are dissolved in one another, preferably at elevated temperature.

In one embodiment of the present invention the liquid crystal medium is injected between the first and second substrate or is filled into the cell by capillary force after combining the first and second substrate. In an alternative embodiment, the liquid crystal composition may be interposed between the first and second substrates by combining the second substrate to the first substrate after loading the liquid crystal composition on the first substrate. Preferably, the liquid crystal is dispensed dropwise onto a first substrate in a process known as "one drop filling" (ODF) process, as disclosed in for example JPS63-179323 and JPH10-239694, or using the Ink Jet Printing (IJP) method.

In a preferred embodiment, the process according to the invention contains a process step where the liquid crystal inside the device cell is allowed to rest for a period of time in order to evenly redistribute the liquid crystal medium inside the cell (herein referred to as "annealing").

However, it is likewise preferred that the annealing step is combined with a previous step, such as edge sealant pre-curing. In which case a 'separate' annealing step may not be necessary at all.

To produce the devices according to the present invention, the photoreactive mesogen of formula I is preferably allowed to redistribute in the cell. After filling and assembly, the cell is annealed for a time between 1 min and 3 h, preferably between 2 min and 1 h and most preferably between 5 min and 30 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 80° C.

In a preferred embodiment, one or more of the process steps of filling the cell, annealing, photoalignment and curing of the polymerizable compound is performed at a temperature above the clearing point of the liquid crystal host mixture.

During the photoalignment of the liquid crystal inside the liquid crystal panel, anisotropy is induced by exposing the cell or the liquid crystal layer to linearly polarised light.

In a preferred embodiment of the present invention one or more compounds of formula I, are photoaligned in a first step using linearly polarised light and in a second step further cured using linearly polarized or unpolarised UV light. In the second step all polymerizable compounds are also further cured.

In another preferred embodiment, the linearly polarised light applied according to the inventive process is ultraviolet light which enables simultaneous photoalignment and photocuring of one or more compounds of formula I, and photocuring of the polymerizable compounds of formula P.

Photoalignment of the photoreactive compounds of formula I and curing of the polymerizable groups of compounds of formula I and the curing of the optional polymerizable compounds of formula P can be performed simultaneously or stepwise, preferably stepwise. In case the process is split into different steps, the individual steps can be performed at the same temperature or at different temperatures.

After the photoalignment and curing step(s) a so-called "post-curing" step can optionally be performed by irradiation with UV-light and/or visible light (both either linearly or unpolarised) at reduced temperature in order to remove unreacted polymerizable compounds. The post-curing is preferably performed at above 0° C. and below the clearing point of the utilized LC mixture, preferably 20° C. and below 60° C.° C., and most preferably above 20° C. and below 40° C.

The polymerizable compounds are optionally polymerised or crosslinked (if a polymerizable compound contains two or more polymerizable groups) with the application of an electrical field. The polymerisation can be carried out in one or more steps.

The devices according to the present invention can be used in various electro-optic applications such as for example applications for augmented reality or virtual reality.

Consequently, the invention further relates to the use of a device according to the present invention in an electro-optical device and to an electro-optical device, preferably for augmented reality or virtual reality applications, comprising the device according to present invention as such.

Such electro-optical device includes but is not limited to head mounted displays or eye-ware, preferably goggles or contact lenses.

Unless the context clearly indicates otherwise, as used herein plural forms of the terms herein are to be construed as including the singular form and vice versa.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz or if explicitly stated at a frequency 19 GHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 $cm^2$ and a guard ring. The orientation layers are SE-1211 from Nissan Chemicals, Japan, for homeotropic orientation ($\varepsilon \|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

It will be appreciated that many of the features described above, particularly of the preferred embodiments, are inventive in their own right and not just as part of an embodiment of the present invention.

Independent protection may be sought for these features in addition to, or alternative to any invention presently claimed.

Throughout the present application it is to be understood that the angles of the bonds at a C atom being bound to three adjacent atoms, e.g. in a C=C or C=O double bond or e.g. in a benzene ring, are 120° and that the angles of the bonds at a C atom being bound to two adjacent atoms, e.g. in a C≡C or in a C≡N triple bond or in an allylic position C=C=C are 180°, unless these angles are otherwise restricted, e.g. like being part of small rings, like 3-, 5- or 5-atomic rings, notwithstanding that in some instances in some structural formulae these angles are not represented exactly.

It will be appreciated that variations to the foregoing embodiments of the invention can be made while still falling within the scope of the invention. Alternative features serving the same, equivalent or similar purpose may replace each feature disclosed in this specification, unless stated otherwise. Thus, unless stated otherwise, each feature disclosed is one example only of a generic series of equivalent or similar features.

All the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

The following abbreviations are used to illustrate the liquid crystalline phase behavior of the compounds: K=crystalline; N=nematic; N2=Twist-Bend nematic; S=smectic; Ch=cholesteric; I=isotropic; Tg=glass transition. The numbers between the symbols indicate the phase transition temperatures in ° C.

In the present application and especially in the following examples, the structures of the liquid crystal compounds are represented by abbreviations, which are also called "acronyms". The transformation of the abbreviations into the corresponding structures is straightforward according to the following three tables A to C.

All groups $C_nH_{2n+1}$, $C_mH_{2m+1}$, and $C_lH_{2l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH=CH— preferably is trans-respectively E vinylene.

Table A lists the symbols used for the ring elements, table B those for the linking groups and table C those for the symbols for the left hand and the right-hand end groups of the molecules.

TABLE A

| Ring Elements | |
|---|---|
| C | 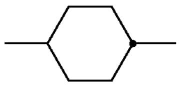 |
| D | 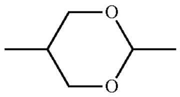 |
| A | 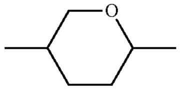 |
| G | 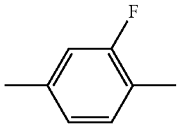 |
| G(Cl) | 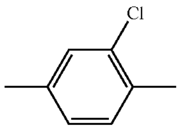 |
| G(1) | 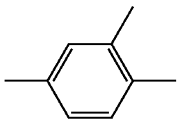 |
| U | 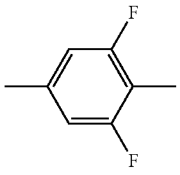 |

TABLE A-continued
| Ring Elements | |
|---|---|
| Y | 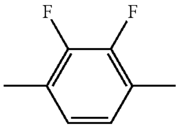 |
| M | 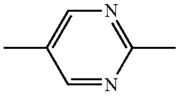 |
| N | 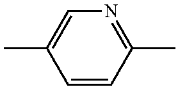 |
| np | 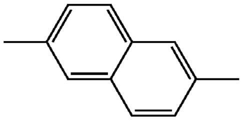 |
| n3f | 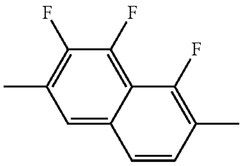 |
| th | 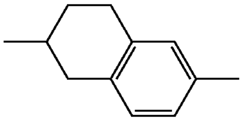 |
| th2f | 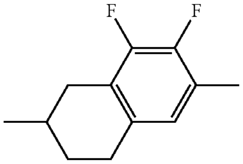 |
| o2f | 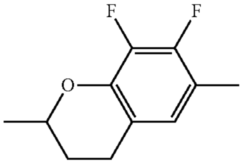 |
| dh | 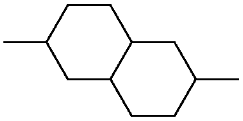 |
| K | 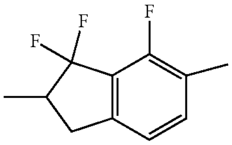 |
| L | 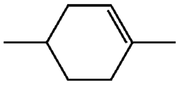 |
TABLE A-continued
| Ring Elements | |
|---|---|
| F | 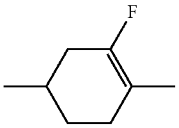 |
| P | 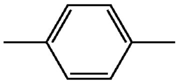 |
| Dl | 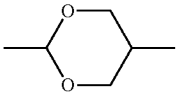 |
| Al | 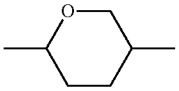 |
| Gl | 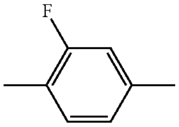 |
| Gl(Cl) | 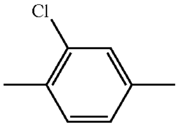 |
| Gl(1) | 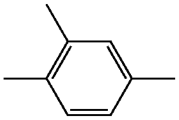 |
| Ul | 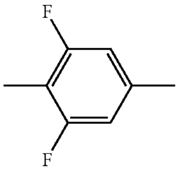 |
| Ml | 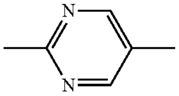 |
| Nl | 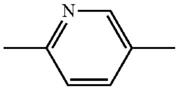 |
| n3fl | 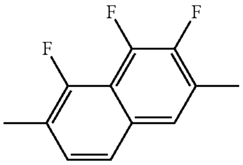 |
| thl | 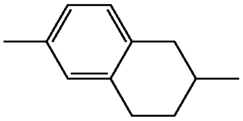 |

TABLE A-continued

| Ring Elements | |
|---|---|
| th2fl | 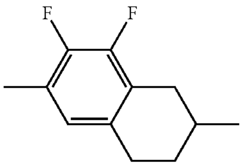 |
| o2fl | 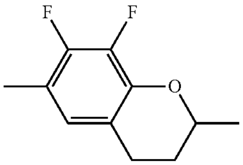 |
| Kl | 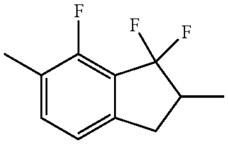 |
| Ll | 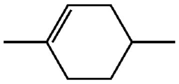 |

TABLE A-continued

| Ring Elements | |
|---|---|
| Fl | 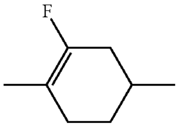 |

TABLE B

| Linking Groups | | | |
|---|---|---|---|
| n | $(-CH_2-)_n$ | "n" is an integer except 0 and 2 | |
| E | $-CH_2-CH_2-$ | | |
| V | $-CH=CH-$ | | |
| T | $-C\equiv C-$ | | |
| W | $-CF_2-CF_2-$ | | |
| B | $-CF=CF-$ | | |
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |

TABLE C

| End Groups | | | |
|---|---|---|---|
| Left hand side, used alone or in combination with others | | Right hand side, used alone or in combination with others | |
| -n- | $C_nH_{2n+1}-$ | -n | $-C_nH_{2n+1}$ |
| -nO— | $C_nH_{2n+1}-O-$ | -nO | $-O-C_nH_{2n+1}$ |
| —V— | $CH_2=CH-$ | —V | $-CH=CH_2$ |
| -nV— | $C_nH_{2n+1}-CH=CH-$ | -nV | $-C_nH_{2n}-CH=CH_2$ |
| —Vn- | $CH_2=CH-C_nH_{2n}-$ | —Vn | $-CH=CH-C_nH_{2n+1}$ |
| -nVm- | $C_nH_{2n+1}-CH=CH-C_mH_{2m}-$ | -nVm | $-C_nH_{2n}-CH=CH-C_mH_{2m+1}$ |
| —N— | $N\equiv C-$ | —N | $-C\equiv N$ |
| —S— | $S=C=N-$ | —S | $-N=C=S$ |
| —F— | F— | —F | —F |
| —CL— | Cl— | —CL | —Cl |
| —M— | $CFH_2-$ | —M | $-CFH_2$ |
| —D— | $CF_2H-$ | —D | $-CF_2H$ |
| —T— | $CF_3-$ | —T | $-CF_3$ |
| —MO— | $CFH_2O-$ | —OM | $-OCFH_2$ |
| —DO— | $CF_2HO-$ | —OD | $-OCF_2H$ |
| —TO— | $CF_3O-$ | —OT | $-OCF_2$ |
| —A— | $H-C\equiv C-$ | —A | $-C\equiv C-H$ |
| -nA— | $C_nH_{2n+1}-C\equiv C-$ | —An | $-C\equiv C-C_nH_{2n+1}$ |
| —NA— | $N\equiv C-C\equiv C-$ | —AN | $-C\equiv C-C\equiv N$ |
| Left hand side, used in combination with others only | | Right hand side, used in combination with others only | |
| - . . . n . . . - | $-C_nH_{2n}-$ | - . . . n . . . | $-C_nH_{2n}-$ |
| - . . . M . . . - | —CFH— | - . . . M . . . | —CFH— |
| - . . . D . . . - | $-CF_2-$ | - . . . D . . . | $-CF_2-$ |
| - . . . V . . . - | —CH=CH— | - . . . V . . . | —CH=CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF=CF— | - . . . W . . . | —CF=CF— |

wherein n und m each are integers and three points " . . . " indicate a space or other symbols of this table.
EXAMPLES
The invention will now be described in more detail by reference to the following working examples, which are illustrative only, and do not limit the scope of the invention.
Utilized Photoreactive Compounds
RM-1
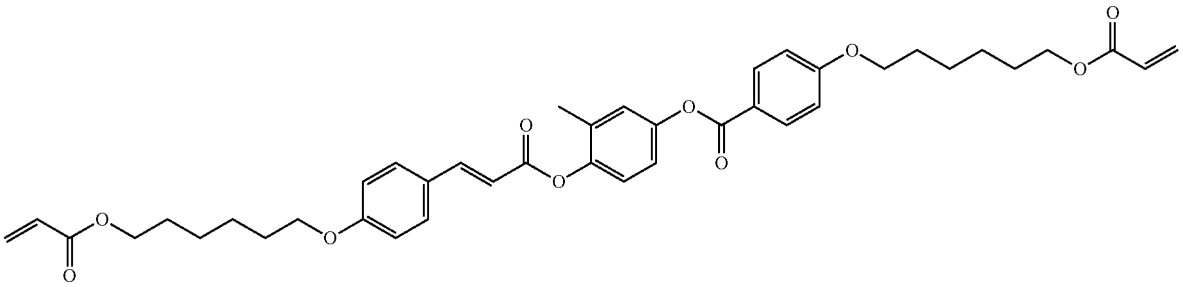
IS19981
RM-2
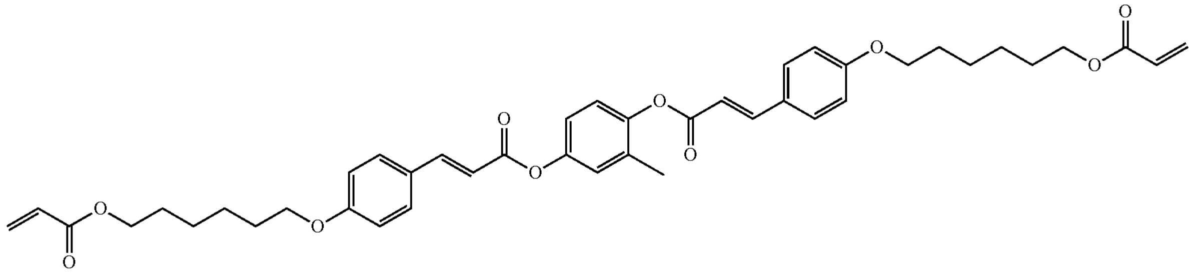
RM-3
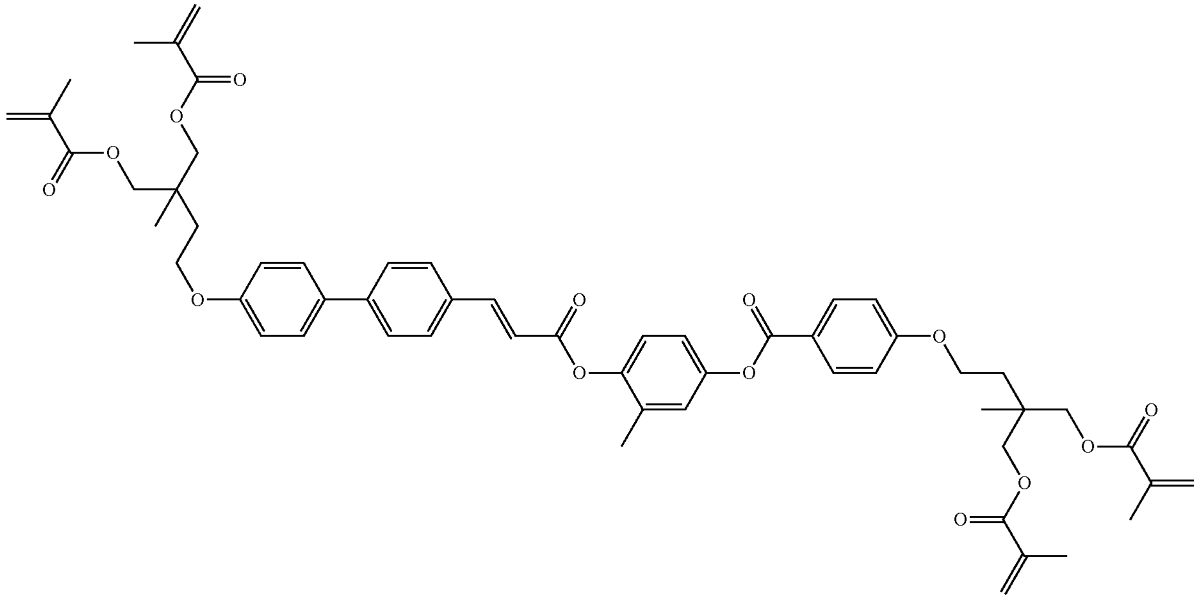

Utilized Nematic Host Mixtures

The nematic LC host mixture are prepared as indicated in the following tables:

| Mixture M-1: | | | |
|---|---|---|---|
| Composition [%-w/w] | | Physical properties | |
| GGP-3-CL | 10.0 | Clearing Point [° C.]: | 103.5 |
| GGP-5-CL | 27.0 | $n_e$ [589 nm, 20° C.]: | 1.746 |
| CPGP-4-3 | 3.0 | Δn [589 nm, 20° C.]: | 0.232 |
| CPGP-5-2 | 3.0 | $\varepsilon_{\parallel}$ [1 kHz, 20° C.]: | 26.1 |
| CPGP-5-3 | 3.0 | $\varepsilon_{\perp}$ [1 kHz, 20° C.]: | 5.0 |
| CCGU-3-F | 9.0 | Δε [1 kHz, 20° C.]: | 21.1 |
| PUQU-2-F | 7.0 | | |
| PUQU-3-F | 8.0 | | |
| PGU-2-F | 8.0 | | |
| PGU-3-F | 8.0 | | |
| PGU-5-F | 8.0 | | |
| PGIGI-3-F | 6.0 | | |
| Σ | 100.0 | | |

| Mixture M-2: | | | |
|---|---|---|---|
| Composition [%-w/w] | | Physical properties | |
| CC-3-V | 36.00 | | |
| CC-3-V1 | 5.00 | cl. p. [° C.]: | 78 |
| CCP-V-1 | 8.00 | $n_e$ [589 nm, 20° C.]: | 1.5907 |
| PGP-2-2V | 3.00 | Δn [589 nm, 20° C.]: | 0.1095 |
| CCQU-3-F | 9.5 | $\varepsilon_{\parallel}$ [1 kHz, 20° C.]: | 16.6 |
| PUQU-3-F | 8.5 | $\varepsilon_{\perp}$ [1 kHz, 20° C.]: | 3.7 |
| APUQU-2-F | 5.00 | Δε [1 kHz, 20° C.]: | 12.9 |
| APUQU-3-F | 8.00 | $K_1$ [pN, 20° C.]: | 12.1 |
| PGUQU-3-F | 4.00 | $K_3$ [pN, 20° C.]: | 13.4 |
| PGUQU-4-F | 8.00 | $K_3/K_1$ [pN, 20° C.]: | 1.11 |
| PGUQU-5-F | 5.00 | $V_0$ [V, 20° C.]: | 1.01 |
| Σ | 100.0 | LTS bulk [h, −20° C.]: | 1000 |

Example 1

Glass cells, with 23 μm gap between substrates, which contained no alignment layers, are capillary filled with mixture consisting of 99.5% w/w of M-1 and 0.5% w/w of RM-2 on a hotplate at 115° C. for 30 minutes without illumination. The cell is then exposed to polarised UV (50 mW/cm2, 120 seconds). The cell is slowly cooled to below isotropic to nematic transition (approx. 20° C. below TNI), by turning the hotplate off with the cells remaining on the hotplate.

The cell gives good uniform planar alignment when observed under the microscope.

Example 2

Glass cells, with 23 μm gap between substrates, which contained no alignment layers, are capillary filled with mixture consisting of 98% w/w of M-1 and 2% w/w of RM-2 on a hotplate at 115° C. for 30 minutes without illumination. The cell is then exposed to polarised UV (50 mW/cm2, 120 seconds). The cell is slowly cooled to below isotropic to nematic transition (approx. 20° C. below TNI), by turning the hotplate off with the cells remaining on the hotplate.

The cell gives good uniform planar alignment when observed under the microscope.

Example 3

A test cell comprising a Fresnel lens structure substrate that is fabricated in accordance with the procedure given in GB 201810565, paragraph [0171] to [0181] and a plain glass substrate is prepared. 10 μm spacers, in UV curable sealant, are used to separate the two substrates. The sealant containing glass spacers is applied to the edges of the cell, and the cell is then illuminated with UV light to cure the glue. The cell is capillary filled on a hotplate at 115° C. for 30 minutes with a mixture consisting of 98% w/w of M-1 and 2% w/w of RM-2. The cell is then exposed to polarised UV (50 mW/cm2, 90 seconds). The cells are slowly cooled to below isotropic to nematic transition (approx. 20° C. below TNI of M-1), by turning the hotplate off with the cells remaining on the hotplate.

The cell gives good uniform planar alignment when observed under the microscope. The embossed Fresnel lens is clearly visible in the bright state. Self-alignment has been achieved over the entire region of the embossed surface feature. The planar alignment is preserved at any angle with respect to the orientation of the surface features.

Example 4

A test cell with one convex and one concave side corresponding to a convex-concave or meniscus lens is formed utilizing a N-BK7 Plano Convex Lens (F=100) having a diameter of 25.4 mm and a thickness of 2 mm, and a N-BK7 Plano Concave Lens (F=100) having a diameter of 25.4 mm and a thickness of 5 mm (both available from Thorlabs, Germany). Before assembling the cell, the plano-concave lens substrate is provided dropwise with a mixture consisting of 99% w/w M-2 and 1% w/w RM-1. The cell is placed on a hotplate at 100° C. for 10 minutes without illumination and is then exposed to polarised UV (35 mW/cm2, 3 steps of 5 min. in total 15 min). The cell is slowly cooled to below isotropic to nematic transition (approx. 20° C. below TNI of M-2), by turning the hotplate off with the cells remaining on the hotplate.

The cell gave acceptable planar alignment when observed under the microscope.

Example 5

A test cell with one convex and one concave side corresponding to a convex-concave or meniscus lens is formed utilizing a N-BK7 Plano Convex Lens (F=100) having a diameter of 25.4 mm and a thickness of 2 mm, and a N-BK7 Plano Concave Lens (F=100) having a diameter of 25.4 mm and a thickness of 5 mm (both available from Thorlabs, Germany). Before assembling the cell, the plano-concave lens substrate is provided dropwise with a mixture consisting of 99.5% w/w M-2 and 0.5% w/w RM-3. The cell is placed on a hotplate at 100° C. for 10 minutes without illumination and is then exposed to polarised UV (35 mW/cm2, 3 steps of 5 min. in total 15 min) utilizing a 360 nm cutoff filter.

The cells is slowly cooled to below isotropic to nematic transition (approx. 20° C. below TNI of M-2), by turning the hotplate off with the cells remaining on the hotplate.

The cell gives acceptable planar alignment when observed under the microscope.

The invention claimed is:

1. A liquid crystal device comprising at least two opposing transparent substrates, at least one liquid crystal switching layer sandwiched between said at least two opposing substrates comprising:

a polymer obtainable from one or more photoreactive mesogens of formula I, $$R^{11}\text{-}Sp^{11}\text{-}X^{11}[\text{-}A\text{-}Z]_o\text{-}A^{11}\text{-}CY^{11}{=}CY^{12}[\text{—}C{=}O]_x[\text{—}O]_y\text{-}A[\text{-}Z\text{-}A]_p\text{-}X^{21}\text{-}Sp^{21}\text{-}R^{21} \quad \text{I}$$

wherein $A^{11}$ denotes a radical selected from the following groups:

a) a group consisting of 1,4-phenylene and 1,3-phenylene, wherein, in addition, one or two CH groups are each optionally replaced by N and wherein, in addition, one or more H atoms are each optionally replaced by L, b) a group selected from the group consisting of

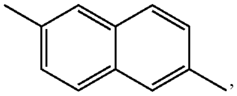,

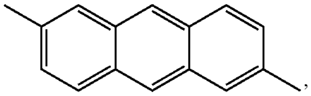,

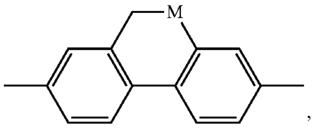,

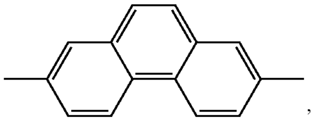,

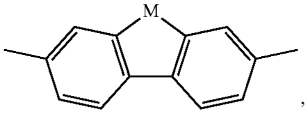,

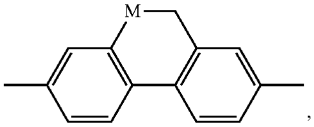,

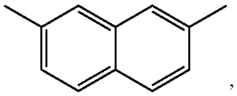,

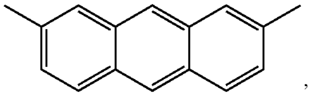,

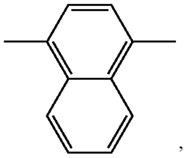, 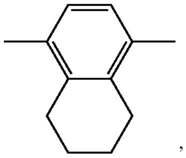,

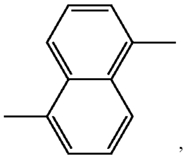, where, in addition, one or more H atoms in these radicals are optionally replaced by L, and/or one or more double bonds are optionally replaced by single bonds, and/or one or more CH groups are optionally replaced by N, A have each, independently of one another, in each occurrence one of the meanings for $A^{11}$ or a) group consisting of trans-1,4-cyclohexylene, 1,4-cyclohexenylene, wherein, in addition, one or more non-adjacent $CH_2$ groups are each optionally replaced by —O— or —S— and wherein, in addition, one or more H atoms are optionally replaced by F, or b) a group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, L on each occurrence, identically or differently, denotes —OH, —F, —Cl, —Br, —I, —CN, —$NO_2$, $SF_5$, —NCO, —NCS, —OCN, —SCN, —C(=O)N($R^z$)$_2$, —C(=O)$R^z$, —N($R^z$)$_2$, optionally substituted silyl, optionally substituted aryl having 6 to 20 C atoms, or straight-chain alkyl or alkoxy having 1 to 25 C atoms, straight chain alkylcarbonyl, alkoxycarbonyl, alkylcarbonyloxy, alkoxycarbonyloxy having 2 to 25 C atoms, branched or cyclic alkyl or alkoxy having 3 to 25 C atoms, or branched or cyclic alkylcarbonyl, alkoxycarbonyl, alkylcarbonyloxy, or alkoxycarbonyloxy having 4 to 25 C atoms, or $X^{21}$—$Sp^{21}$-$R^{21}$, M denotes —O—, —S—, —$CH_2$—, —$CHR^z$— or —$CR^yR^z$—, $R^y$ and $R^z$ each, independently of one another, denote H, CN, F, or alkyl having 1-12 C atoms, wherein one or more H atoms are each optionally replaced by F, $Y^{11}$ and $Y^{12}$ each, independently of one another, denote H, F, phenyl, or optionally fluorinated alkyl having 1-12 C atoms, Z denotes, independently of each other, in each occurrence, a single bond, —COO—, —OCO—, —O—CO—O—, —$OCH_2$—, -$CH_2O$—, —$OCF_2$-, -$CF_2O$—, $(CH_2)_n$—, —$CF_2CF_2$—, —CH=CH—, —CF=CF—, —CH=CH—COO—, —OCO—CH=CH—, —CO—S—, —S—CO—, —CS—S—, —S—CS—, —S—CSS—, or —C≡C—, n denotes an integer between 2 and 8, o and p denote each and independently 0, 1 or 2, x and y denote each and independently 0 or 1, under the condition that if x denotes 0, y cannot denote 1, $X^{11}$ and $X^{21}$ denote independently from one another, in each occurrence a single bond, —CO—O—, —O—CO—, —O—COO—, —O—, —CH=CH—, —C≡C—, —$CF_2$—O—, —O—$CF_2$—, —$CF_2$—$CF_2$—, —$CH_2$—O—, —O—$CH_2$—, —CO—S—, —S—CO—, —CS—S—, —S—CS—, —S—CSS—, or —S—, $Sp^{11}$ and $Sp^{21}$ denote each and independently, in each occurrence a single bond or a spacer group comprising 1 to 20 C atoms, wherein one or more non-adjacent and non-terminal $CH_2$ groups are each optionally replaced by —O—, —S—, —NH—, —N($CH_3$)—, —CO—, —O—CO—, —S—CO—, —O—COO—, —CO—S—, —CO—O—, —$CF_2$—, —$CF_2O$—, —$OCF_2$— —CH(OH)-, —CH(alkyl)-, —CH(alkenyl)-, —CH(alkoxyl)-, —CH(oxaalkyl)-, —CH=CH—, or —C≡C—, however in such a way that no two O-atoms are adjacent to one another and no two groups selected from —O—CO—, —S—CO—, —O—COO—, —CO—S—, —CO—O— and —CH═CH— are adjacent to each other, $R^{11}$ denotes P, $R^{21}$ denotes P, halogen, CN, optionally fluorinated alkyl, or alkenyl with up to 15 C atoms in which one or more non-adjacent $CH_2$-groups are each optionally replaced by

—O—, —S—, —CO—, -C(O)O—, —O—C(O)-, O—C(O)—O—,

P each and independently from another in each occurrence a polymerizable group, and one or more nematogenic compounds;

wherein an electrode structure is provided on one or both of the at least two opposing substrates, wherein one or more of said at least two opposing substrates correspond to an optical grating or a lens structure, or one or more of said at least two opposing substrates are additionally provided with an optical grating or a lens structure adjacent to the at least one liquid crystal switching layer; and wherein said device is a beam focusing device.

2. The device according to claim 1, wherein said one or more of said at least two opposing substrates correspond to or are provided with:

a plano-concave lens structure,
a plano-convex lens structure,
a bi-convex lens structure,
a bi-concave lens structure,
a refractive Fresnel lens structure, or
a diffractive Fresnel lens structure.

3. The device according to claim 1, wherein one or more of said at least two opposing substrates correspond to or are provided with:

a surface relief grating,
a blazed grating,
a volume grating,
a Pancharatnam-Berry grating, or
a Bragg Polarization Grating.

4. The device according to claim 1, wherein the at least one liquid crystal switching layer has a maximum thickness in the range from 1 μm to 100 μm.

5. The device according to claim 1, wherein the electrode structure is selected from interdigitated electrodes, IPS electrodes, FFS electrodes, and comb like electrodes.

6. The device according to claim 1, wherein said one or more nematogenic compounds are selected from the following formulae:

CY

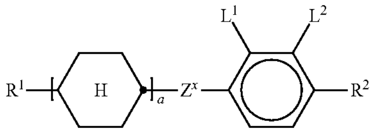

PY

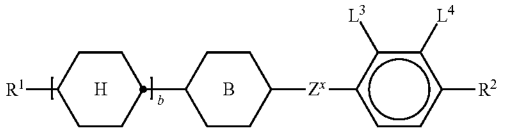

wherein a is 1 or 2, b is 0 or 1,

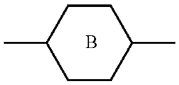

denotes

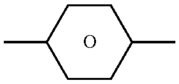

or

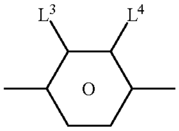

$R^1$ and $R^2$ each, independently of one another, denote alkyl having 1 to 12 C atoms, where, in addition, one or more non-adjacent $CH_2$ groups are each optionally replaced by —O—, —CH═CH—, —CO—, —O—CO—, or —CO—O— in such a way that O atoms are not linked directly to one another, $Z^x$ denotes —CH═CH—, —$CH_2O$—, —$OCH_2$—, —$CF_2O$—, —$OCF_2$—, —O—, —$CH_2$—, —$CH_2CH_2$—, or a single bond, and $L^{1-4}$ each, independently of one another, denote F, Cl, $OCF_3$, $CF_3$, $CH_3$, $CH_2F$, or $CHF_2$.

7. The device according to claim 1, wherein said one or more nematogenic compounds are selected from the following formula:

ZK

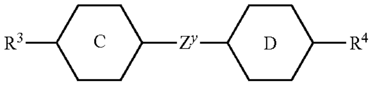

in which the individual radicals have the following meanings:

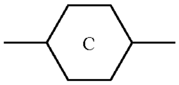

denotes

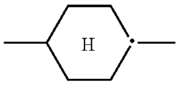

,

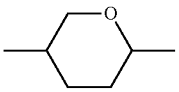

,

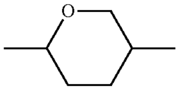

,

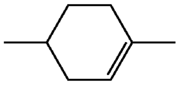

or

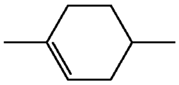

,

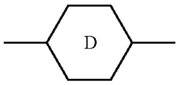

denotes

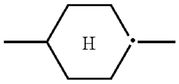

or

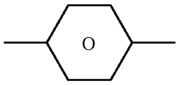

, $R^3$ and $R^4$ each, independently of one another, denote alkyl having 1 to 12 C atoms, in which, in addition, one or two non-adjacent $CH_2$ groups are each optionally replaced by —O—, —CH═CH—, —CO—, —O—CO— or —CO—O— in such a way that O atoms are not linked directly to one another, and $Z^y$ denotes —$CH_2CH_2$—, —CH—CH—, —$CF_2O$—, —$OCF_2$—, —$CH_2O$—, —$OCH_2$—, —CO—O—, —O—CO—, -$C_2F_4$-, —CF═CF—, —CH═CH—$CH_2O$—, or a single bond.

8. A method of production of a device according to claim 1, comprising one or more of the following steps:

providing an electrode structure on one or more of said at least two opposing substrates, providing an optical grating or a lens structure on one or more substrates, and assembling a cell from said at least two opposing substrates, filling the cell with a liquid crystal medium comprising one or more photoreactive-mesogens of formula I and one or more nematogenic compounds, irradiating the cell with linearly polarized light, curing the polymerizable compounds of the liquid crystal medium by irradiation with ultraviolet light or visible light having a wavelength of 450 nm or below whereby the liquid crystal medium forms said at least one switching layer.

9. An electro-optical device comprising the liquid crystal device according to claim 1.

10. The electro-optical device according to claim 9, wherein the electro-optical device is a device for augmented reality applications or a device for virtual reality applications.

11. The electro-optical device according to claim 9, wherein the electro-optical device is goggles or contact lens.

12. The device according to claim 1, wherein that at least one liquid crystal switching layer contains from 0.01 to 10 weight % of mesogens of formula I.

13. The device according to claim 1, wherein that at least one liquid crystal switching layer contains from 0.05 to 5 weight % of mesogens of formula I.

14. The device according to claim 1, wherein that at least one liquid crystal switching layer contains from 0.1 to 3 weight % of mesogens of formula I.

15. The device according to claim 1, wherein the mesogens of formula I are selected from compounds RM-1 to RM-3:

RM-1

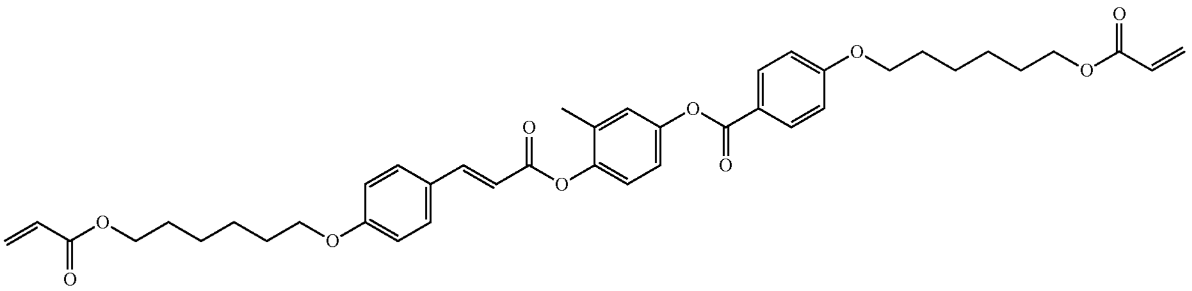

RM-2

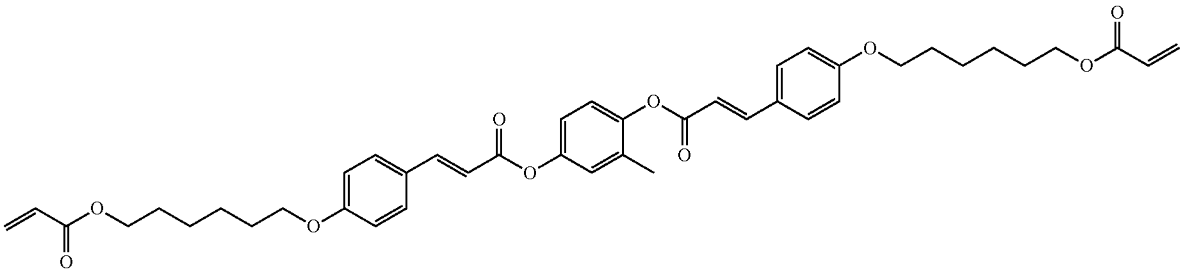

-continued

RM-3

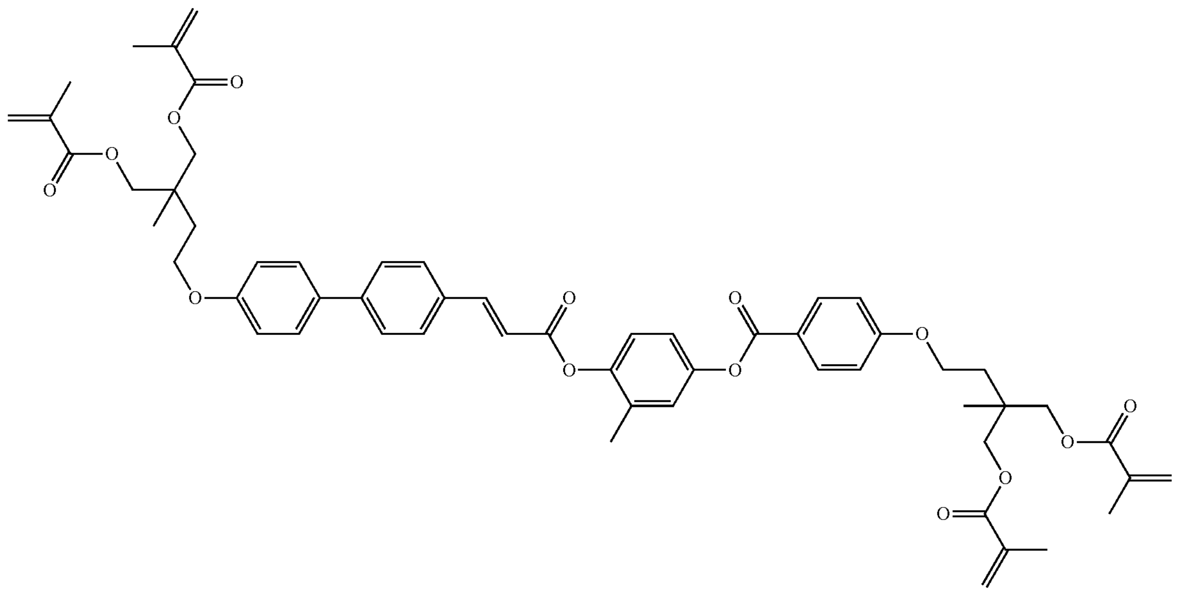

16. The device according to claim 1, wherein said one or more nematogenic compounds are selected from the following formulae:

II

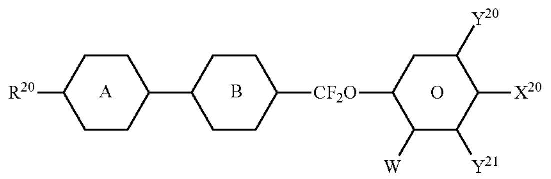

III

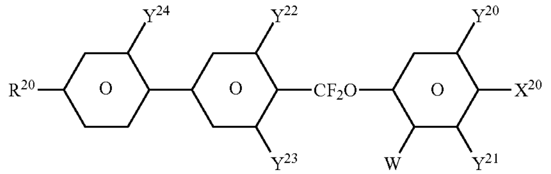

wherein $R^{20}$ each, identically or differently, denote a halogenated or unsubstituted alkyl or alkoxy radical having 1 to 15 C atoms, where, in addition, one or more $CH_2$ groups in these radicals are each optionally replaced, independently of one another, by-C≡C—, —$CF_2O$—, —CH═CH—,

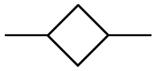 , 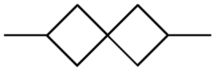 ,

O—, —CO—O—, or —O—CO— in such a way that O atoms are not linked directly to one another, $X^{20}$ each, identically or differently, denote F, CI, CN, $SF_5$, SCN, NCS, a halogenated alkyl radical, a halogenated alkenyl radical, a halogenated alkoxy radical, or a halogenated alkenyloxy radical, each having up to 6 C atoms, $Y^{20-24}$ each, identically or differently, denote H or F, W denotes H or methyl, and

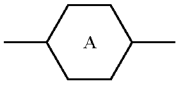 and 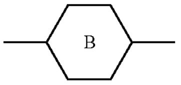

each, identically or differently, denote

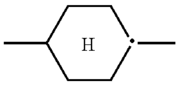 , 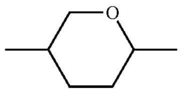 or

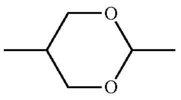 .

17. The device according to claim 1, wherein said one or more nematogenic compounds are selected from the following formulae:

XI

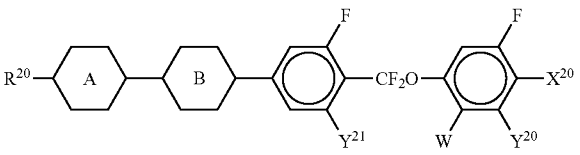

-continued

XII

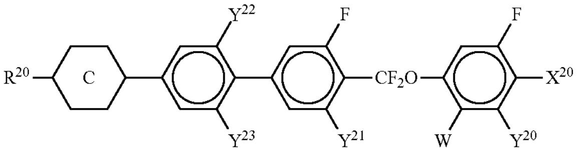

wherein $R^{20}$ each, identically or differently, denote a halogenated or unsubstituted alkyl or alkoxy radical having 1 to 15 C atoms, where, in addition, one or more $CH_2$ groups in these radicals are each optionally replaced, independently of one another, by-C≡C—, $CF_2O$—, —CH═CH—,

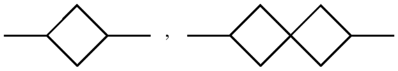

—O—, —CO—O—, or —O—CO— in such a way that O atoms are not linked directly to one another, $X^{20}$ each, identically or differently, denote F, CI, CN, $SF_5$, SCN, NCS, a halogenated alkyl radical, a halogenated alkenyl radical, a halogenated alkoxy radical, or a halogenated alkenyloxy radical, each having up to 6 C atoms, $Y^{20}$-24 each, identically or differently, denote H or F, W denotes H or methyl,

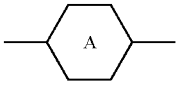 and 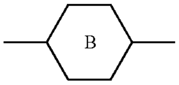

each, independently of one another, denote

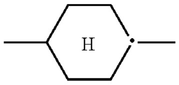, 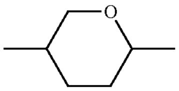 or

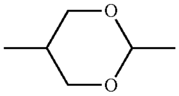

and

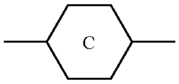

denotes

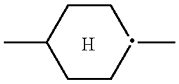, 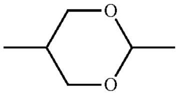,

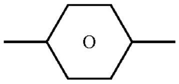, 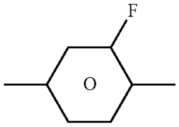 or

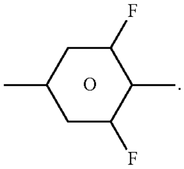.

* * * * *